(12) United States Patent
Gilbert et al.

(10) Patent No.: US 11,629,771 B2
(45) Date of Patent: *Apr. 18, 2023

(54) VALVE STIFFNESS ADJUSTMENT

(71) Applicant: Fox Factory, Inc., Duluth, GA (US)

(72) Inventors: Damon Gilbert, Aptos, CA (US); William O. Brown, IV, Aptos, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/801,774

(22) Filed: Feb. 26, 2020

(65) Prior Publication Data

US 2020/0208706 A1    Jul. 2, 2020

Related U.S. Application Data

(63) Continuation of application No. 15/965,642, filed on Apr. 27, 2018, now Pat. No. 10,578,184.

(51) Int. Cl.
*F16F 9/348* (2006.01)
*F16F 9/44* (2006.01)
(Continued)

(52) U.S. Cl.
CPC ............ *F16F 9/348* (2013.01); *B60G 13/08* (2013.01); *B60G 17/016* (2013.01); *B60G 17/0152* (2013.01); *B60G 17/08* (2013.01); *F16F 9/19* (2013.01); *F16F 9/3485* (2013.01); *F16F 9/44* (2013.01); *F16F 9/462* (2013.01); *F16F 9/469* (2013.01); *F16F 9/50* (2013.01);
(Continued)

(58) Field of Classification Search
CPC .. F16F 9/348; F16F 9/3485; F16F 9/44; F16F 9/46; F16F 9/461; F16F 9/462; F16F 9/52; F16F 2228/06; F16F 2228/066; F16F 2228/08; B60G 2600/20; B60G 2600/21

See application file for complete search history.

(56) References Cited

U.S. PATENT DOCUMENTS 3,256,960 A * 6/1966 Casimir ................. F16F 9/464
                                                   188/266.2
4,653,617 A * 3/1987 Casimir ................. F16F 9/464
                                                   137/906
(Continued)

FOREIGN PATENT DOCUMENTS

DE         3526156 C2 *  9/1988  ............. F16F 9/464
DE   202012012865 U1 *  2/2014  ............... F16F 1/22
(Continued)

OTHER PUBLICATIONS

EPO machine translation, WO 01/65140 A1, Goncalves, Nelson C. (Year: 2004).

*Primary Examiner* — Thomas J Williams

(57) ABSTRACT

A damper valve with an adjustable effective stiffness of a shim. The damper valve includes a piston. The piston has a fluid path formed therethrough. A shim is disposed proximate the fluid path formed through the piston. A stiffness adjustment feature is coupled to the shim, and the shim is disposed between the piston and the stiffness adjustment feature. The stiffness adjustment feature is configured to adjust the effective stiffness of the shim without affecting a preload applied to the shim.

28 Claims, 13 Drawing Sheets

Related U.S. Application Data

(60) Provisional application No. 62/506,531, filed on May 15, 2017.

(51) Int. Cl.
| | |
|---|---|
| *F16F 9/19* | (2006.01) |
| *B60G 13/08* | (2006.01) |
| *B60G 17/08* | (2006.01) |
| *B60G 17/016* | (2006.01) |
| *F16F 9/46* | (2006.01) |
| *F16F 9/50* | (2006.01) |
| *B60G 17/015* | (2006.01) |
| *F16F 9/516* | (2006.01) |

(52) U.S. Cl.
CPC ........ *F16F 9/5165* (2013.01); *B60G 2202/24* (2013.01); *B60G 2206/41* (2013.01); *B60G 2401/00* (2013.01); *B60G 2401/28* (2013.01); *B60G 2500/112* (2013.01); *B60G 2600/20* (2013.01); *B60G 2600/21* (2013.01); *B60G 2800/162* (2013.01); *F16F 2222/12* (2013.01); *F16F 2228/066* (2013.01); *F16F 2230/18* (2013.01)

(56) References Cited

U.S. PATENT DOCUMENTS

| | | | |
|---|---|---|---|
| 4,948,163 A | 8/1990 | Kikushima et al. | |
| 4,949,989 A | 8/1990 | Kakizaki et al. | |
| 4,961,483 A | 10/1990 | Yamaoka et al. | |
| 4,984,819 A | 1/1991 | Kakizaki et al. | |
| 5,133,434 A * | 7/1992 | Kikushima | F16F 9/464 |
| | | | 137/493.9 |
| 6,672,435 B2 * | 1/2004 | Lemieux | F16F 9/3485 |
| | | | 188/289 |
| 10,578,184 B2 * | 3/2020 | Gilbert | F16F 9/44 |
| 2010/0163356 A1 | 7/2010 | Hennecke et al. | |
| 2016/0375951 A1 | 12/2016 | Gilbert et al. | |
| 2018/0003260 A1 * | 1/2018 | Marble | F16F 9/52 |

FOREIGN PATENT DOCUMENTS

| | | | | |
|---|---|---|---|---|
| EP | 1484527 | A1 | 12/2004 | |
| FR | 2805872 | A1 * | 9/2001 | ............. F16F 9/3485 |
| GB | 1128249 | A * | 9/1968 | ............. B60G 17/08 |
| GB | 2332727 | A | 6/1999 | |
| WO | 0165140 | A1 | 9/2001 | |

\* cited by examiner

VALVE STIFFNESS ADJUSTMENT

RELATED APPLICATION

This application is a continuation application of and claims the benefit of co-pending U.S. patent application Ser. No. 15/965,642, filed Apr. 27, 2018, entitled, "VALVE STIFFNESS ADJUSTMENT", by Damon Gilbert et al., assigned to the assignee of the present application, which is incorporated herein in its entirety by reference thereto.

The patent application Ser. No. 15/965,642 claims priority to and benefit of U.S. Provisional Patent Application 62/506,531, filed May 15, 2017, entitled, "ADJUSTABLE DAMPING THROUGH VARIABLE MOVEMENT ARM", by Damon Gilbert, assigned to the assignee of the present application, which is incorporated herein in its entirety by reference thereto.

FIELD OF THE INVENTION

Embodiments of the present technology relate generally to shock absorbers.

BACKGROUND

Current shock absorption technologies include fluid dampers that vary the amount of damping force provided to a sprung mass of a system by channeling fluid through various passageways and valves to constrict fluid flow, increase pressures, and bypass damping fluid chambers. Various damping characteristic curves may result, for example, from tuning various parameters including the sizes and locations of piston orifices, and certain aspects of valve shims.

BRIEF DESCRIPTION OF THE DRAWINGS

Aspects of the present invention are illustrated by way of example, and not by way of limitation, in the accompanying drawings, wherein.

Figure 1:
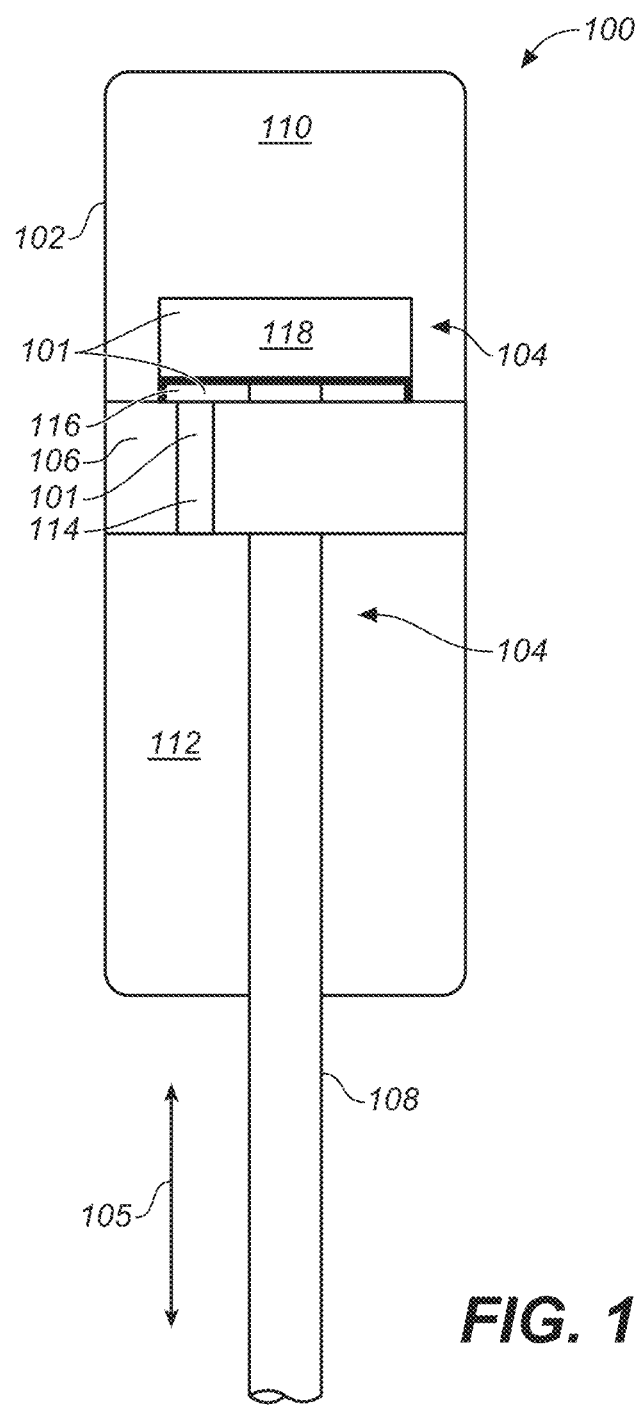
FIG. 1 is a schematic depiction of a suspension damper, in accordance with an embodiment of the present invention.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Conventionally, a shim or a stack of shims (referred to as a shim stack) is disposed on a piston at least partially covering an orifice in the piston (piston orifice) such that the shim at least partially obstructs fluid flow through a fluid path in the piston and out of the piston orifice. For the purpose of clarity, the following discussion will refer to a single shim, but it will be understood that the following discussion also applies to a shim stack comprised of a plurality of shims. It should further be understood that the following discussion also applies to a stack of shims having the same diameter, and that the following discussion also applies to a stack of shims wherein at least some of the shims having differing diameters. Again, for the purpose of clarity, in the present Figures, a single shim is depicted. It should again be understood that such a depiction is provided for the purpose of clarity and that embodiments of the present invention are not limited to the use of a single shim.

It should be noted that various terms are used, by those of ordinary skill in the art, to describe the components utilized to control fluid flow in a suspension damper. Typically, a suspension damper is referred to as having at least one damper valve which is used to control fluid flow within the suspension damper. The control of fluid flow by the damper valve (or multiple damper valves) is at least partially determinate of the damping characteristics of the suspension damper. Most commonly, a damper valve is described, by those of ordinary skill in the art, as being comprised of numerous components. These components typically include, but are not limited to: the diameter of the fluid path through the piston; the diameter of the piston orifices (e.g. the diameter of the inlet piston orifice (i.e., where fluid enters the fluid path through the piston), and/or the diameter of the outlet piston orifice (i.e., where fluid exits the fluid path through the piston)); the length of the fluid path; and characteristics of the shim (or shim stack) which typically at least partially obstructs an orifice of the fluid path through the piston. For purposes of the following discussion, it should be noted that adjustments to a particular component comprising the valve may be referred to as adjusting that "component", and such adjustments may also be referred to as adjusting the "damper valve" which includes that component. For purposes of the present discussion, the "effective stiffness" of a shim, refers to the amount of force required to deflect the shim. More specifically, as will be described below in detail, adjustments to the "effective stiffness" of a shim (or shim stack) may also be referred to as adjustments to the stiffness of the damper valve which includes that shim (or shim stack).

As will be described in detail below, embodiments of the present invention, provide a novel and inventive structure and methodology for adjusting the effective stiffness of a shim. The following discussion, in conjunction with FIG. 1, will provide a descriptive overview of various components, terms, and features corresponding to embodiments of the present invention. The following discussion will then provide a detailed description of the present novel and inventive structure and methodology for adjusting the effective stiffness of a shim.

As a descriptive overview of various components, terms, and features corresponding to embodiments of the present invention, refer now to FIG. 1, wherein a schematic depiction of a suspension damper 100 (also referred to as a damper) is provided in accordance with one embodiment of the present invention. Suspension damper 100 includes a housing 102 which encloses a damping chamber 104. A piston 106 (also referred to as a main piston or damping piston) is disposed within damping chamber 104. Piston 106 is coupled to a rod 108. Rod 108 and piston 106 are movable into and out of damping chamber 104, as indicated by arrow 105. Additionally, piston 106 divides damping chamber 104 into a first region (referred to herein as a compression chamber 110) and into a second region (referred to herein as a rebound chamber 112). It will be understood that damping chamber 104 typically contains a damping fluid, not shown, through which piston 106 moves.

Referring still to FIG. 1, piston 106 has a fluid path 114 formed therethrough. A shim 116 is disposed at least partially obstructing fluid path 114. As stated above, for the purpose of clarity, the following discussion will refer to a single shim, but it will be understood that the following discussion also applies to a shim stack.

Additionally, in the present embodiment, a stiffness adjustment feature 118 is schematically depicted FIG. 1. Stiffness adjustment feature 118 is schematically depicted in FIG. 1, to show its location, in one embodiment, with respect to the various other components of suspension damper 100. In the present embodiment, shim 116 is disposed between piston 106 and stiffness adjustment feature 118. As will be described below in detail, in various embodiments, stiffness adjustment feature 118 is configured to adjust the effective stiffness of shim 116 without affecting a preload applied to shim 116. Again, for purposes of the present discussion, the "effective stiffness" of the shim, refers to the amount of force required to deflect shim 116. Stiffness adjustment feature 118 will be, however, described in detail below, and stiffness adjustment feature 118 will be clearly depicted in the following Figures. In the present embodiment, fluid path 114, in conjunction with shim 116 and stiffness adjustment feature 118, is referred to as a "damper valve" 101. It should be understood, however, that those of ordinary skill in the art may sometimes define the "damper valve" 101 to not include fluid path 114, and, instead, consider damper valve 101 to be comprised only of those components (other than the fluid path 114) which control the flow of fluid, for example, from rebound chamber 112 to compression chamber 110. For purposes of consistency and clarity, and not intended as a limitation to the embodiments of the present invention, the following discussion will refer to the "damper valve" (shown as 101 in the embodiment of FIG. 1) as being comprised of fluid path 114, in combination with shim 116 and stiffness adjustment feature 118.

Typically, during operation of a damper valve, a pressure is exerted upon the shim by a damping fluid, and if the force of the damping fluid is great enough to deflect the shim sufficiently, damping fluid is able to flow past the deflected shim and the damper valve is considered "open". If the pressure exerted upon the shim by a damping fluid is not great enough to deflect the shim sufficiently, damping fluid is not able flow past the shim and the damper valve is considered "closed".

In the present embodiments, and as will be described in detail below, stiffness adjustment feature 118 is able to vary the force required to deflect shim 116, thereby adjusting the effective stiffness of shim 116. Hence, the present embodiments provide a damper valve 101 having an adjustable effective stiffness for shim 116. Thus, by providing a damper valve 101 having an adjustable effective stiffness for shim 116, embodiments of the present invention are able to vary the amount of fluid pressure required to open the damper valve 101 without requiring the user to replace shims.

In damper valves, the amount of obstruction to fluid flow through a piston orifice is determined, at least partially, based upon the characteristics of the shim. For example, conventional damper valves may replace a shim having a lesser thickness/gauge with a shim having a greater thickness/gauge to obtain a shim having a greater stiffness and thereby increase the amount of obstruction, provided by the shim, to fluid flow through the piston orifice. Typically, the amount of fluid pressure required to deflect or bend a shim having a greater thickness/gauge (and corresponding greater stiffness) is higher than the amount of fluid pressure required to deflect or bend a shim having a lesser thickness/gauge (and corresponding lesser stiffness). Further, in some conventional damper valves, the amount of obstruction to fluid flow through a piston orifice is determined, at least partially, based upon the type of material from which the shim is made. For example, conventional damper valves may replace a shim made from a material having a lesser modulus of elasticity with a shim made from a material having a greater modulus of elasticity to increase the stiffness of the shim and, as a result, increase the amount of obstruction to fluid flow through the piston orifice. Typically, the amount of fluid pressure required to deflect or bend a shim having a greater modulus of elasticity is higher than the amount of fluid pressure required to deflect or bend a shim having a lesser modulus of elasticity.

It should be noted, that in many prior art damper valves, if it was desired to change the stiffness of a shim, the suspension damper would first need to be taken apart. Next, in many prior art damper valves, the shim (or shim stack or some portion of a shim stack) would need to be removed and replaced with a different shim (or shim stack or some portion of a shim stack) to attempt to obtain a shim (or shim stack or some portion of a shim stack) having desired stiffness. The replacement of shims in a conventional suspension damper can occur during manufacture or assembly of the suspension damper, or can be required to be performed by a user of the suspension damper. This prior art process of replacing shims is time-consuming, prone to error (e.g., the new shim (or shim stack or some portion of a shim stack) doesn't provide the desired shim stiffness), and is often beyond the capability of many of the users of conventional suspension dampers.

Additionally, it should be noted, that many prior art damper valves attempt to change the amount of force required to open a damper valve by applying a preload to the shim. Conventionally, a preload applied to a shim will provide an initial force to the shim. In some instances, the preload will actually bend or deflect the shim. In fact, the amount of preload is sometimes referred to as the amount pre-bending of a shim. Some conventional suspension dampers will even form a recessed region or "dish" in the surface to which the shim is applied, such that when the shim is preloaded, the bent shim will conform to the recessed region. Typically, the amount of force required to deflect or bend a shim increases the farther the shim is bent. For example, the force required to initially bend or deflect a shim is typically less than the force required to further bend the shim beyond that initial bending or deflection. As a result, by applying a preload (or pre-bending) to a shim, a greater force is required to additionally deflect or bend the preloaded shim (as compared to the force required to deflect or bend the same shim when not preloaded) to the extent that damping fluid is able to flow past the preloaded shim and the open the damper valve. Thus, by applying a preload to a shim, a greater initial force is required to deflect or bend the preloaded shim and open the damper valve. As will be described in detail below, embodiments of the present invention provide a damper valve having an adjustable effective stiffness for shim 116 without requiring the user to apply a preload to the shim, or alter any existing preload applied to the shim. Thus, embodiments of the present invention are able to vary the amount of fluid pressure required to open the damper valve without requiring the user to apply a preload to the shim or alter any existing preload applied to the shim.

It should further be noted that some conventional dampers will attempt to increase a force required to deflect a shim by channeling damping fluid through various specifically added orifices and into additional chambers, such as pilot chambers. In other conventional suspension dampers, pressure (such as air pressure) is added to chambers within the suspension damper, in an attempt to increase a force required to deflect a shim. Conventional approaches (such as those described in this paragraph) to increase the force required to deflect a shim frequently introduce manufacturing complexity, additional cost, and potential sources of suspension damper failure. Embodiments of the present invention, however, are able to adjust the effective stiffness of a shim without requiring many of the features employed by conventional approaches for increasing a load on a shim.

Referring again to FIG. 1, the damper valve 101 is used to control the flow of damping fluid from rebound chamber 112 through fluid path 114 of piston 106 and into compression chamber 110. In the embodiment of FIG. 1, the entire route through which fluid flows from rebound chamber 112 and into compression chamber 110 (including through the damper valve 101) is referred to as a rebound circuit. It will be understood that such fluid flow may occur, for example, when piston 106 moves downward or further out of damping chamber 104 during a rebound stroke. Hence, in the embodiment depicted in FIG. 1, the damper valve 101 is used to control fluid flow in a rebound circuit.

In one embodiment, fluid flow from rebound chamber 112 to compression chamber 110 normally occurs along a path, not shown, other than through fluid path 114. Such fluid flow is commonly referred to as low speed fluid flow, and the path, not shown, is sometimes referred to as the low speed rebound circuit. In such an embodiment, fluid flow only occurs through fluid path 114, and the rest of the damper valve 101, during a rapid or high speed rebound stroke. In such an embodiment, the damper valve 101 of FIG. 1 is used to control fluid flow in a high speed rebound circuit. It should be noted that embodiments of the present invention are not limited to use with a main damping piston (such as, e.g., piston 106). Instead, the various embodiments of the present invention are well suited to use with pistons other than main damping pistons. Further, the various embodiments of the present invention are well suited to use with various damping circuits other than rebound circuits and/or high speed rebound circuits (e.g., but not limited to, compression circuits, base valve circuits, etc.). The embodiments of the present invention are also well suited to use in combination. That is, embodiments of the present invention are well suited, for example, to use on both a compression circuit and a rebound circuit (high speed rebound circuit and/or low speed rebound circuit) in the same suspension damper. Similarly, embodiments of the present invention are well suited, for example, to use on both a main damping piston and a base valve of the same suspension damper. These two examples are provided to illustrate various possible combinations of use for the present embodiments, and are not intended to be a limiting or exhaustive list of various possible combinations of use for the present embodiments.

Figure 2:
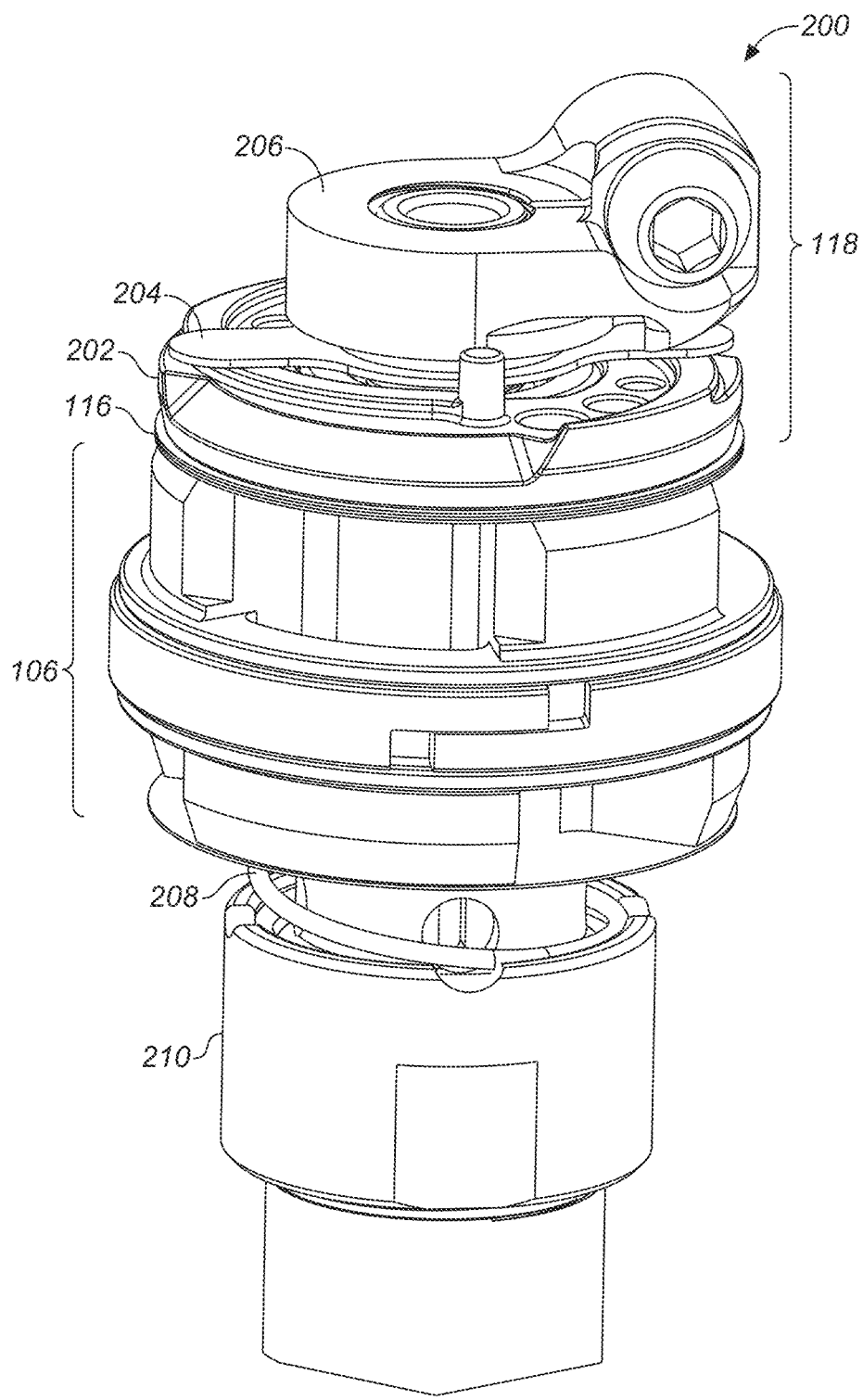
FIG. 2 is a side perspective view of a damper piston assembly including a damper valve with an adjustable effective stiffness of a shim, in accordance with an embodiment of the present invention.

Referring now to FIG. 2, a detailed description of the present novel and inventive structure and methodology for adjusting the effective stiffness of a shim is provided below. FIG. 2 is a side perspective view of a damper piston assembly 200 including a damper valve 101 with an adjustable effective stiffness of a shim, in accordance with embodiments of the present invention. Damper piston assembly 200 includes a piston 106 having a fluid path (hidden) formed through at least a portion of piston 106. As described above in conjunction with FIG. 1, the fluid path provides a path for the flow of fluid from a region beneath piston 106 (e.g. rebound chamber 112 of FIG. 1) through piston 106, and to a region above piston 106 (e.g. compression chamber 110 of FIG. 1). Damper piston assembly 200 further includes a shim 116 which is disposed proximate the fluid path through piston 106. In the present embodiment, shim 116 is disposed at least partially obstructing the outlet piston orifice of the fluid path through piston 106. Stiffness adjustment feature 118 is coupled to shim 116. In the present embodiment, shim 116 is disposed between a top surface of piston 106 and stiffness adjustment feature 118.

With reference still to FIG. 2, in various embodiment of the present invention, stiffness adjustment feature 118 is comprised of a stiffness adjustment plate 202, a spring component 204, and an adjuster 206. In various embodiments of the present invention, and as will be described in detail below, stiffness adjustment feature 118 is configured to adjust an effective stiffness of shim 116 without affecting a preload applied to shim 116. In one embodiment, as depicted in FIG. 2, a spring 208 is provided for applying a force to a compression check valve (hidden), and a spring adjuster 210 is provided for controlling the spring force applied by spring 208 to the compression check valve.

Figure 3:
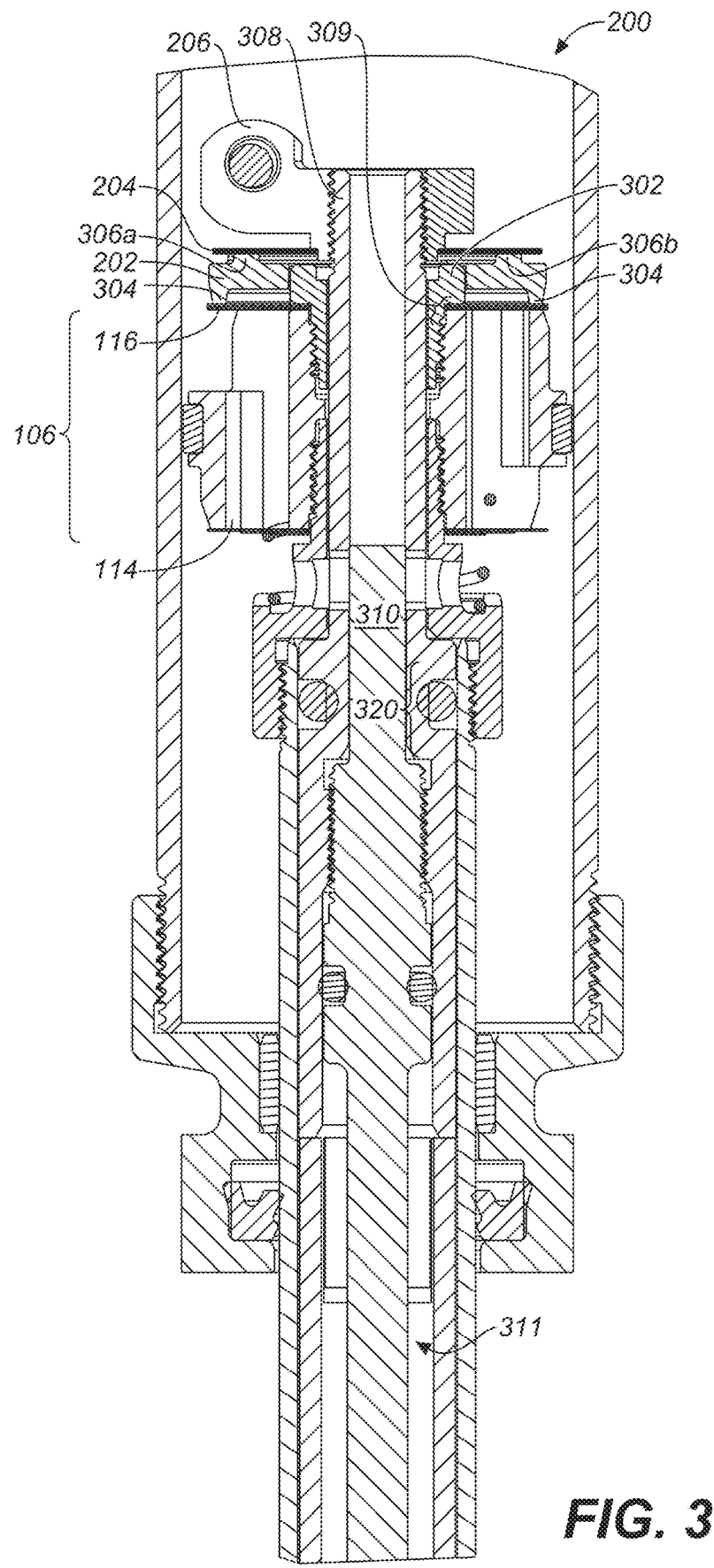
FIG. 3 is a side cut-away view of the damper piston assembly of FIG. 2, in accordance with an embodiment of the present invention.

With reference now to FIG. 3, side cut-away view of the damper piston assembly 200 of FIG. 2 is provided, in accordance with an embodiment of the present invention. In FIG. 3, fluid path 114 is clearly shown extending from a region beneath piston 106 (e.g. rebound chamber 112 of FIG. 1) through piston 106, and to a region above piston 106 (e.g. compression chamber 110 of FIG. 1). Further, in FIG. 3, shim 116 is shown disposed at least partially obstructing fluid path 114. It should again be noted, that for purposes of consistency and clarity, and not intended as a limitation to the embodiments of the present invention, in the following discussion, including, but not limited to the discussion of FIGS. 2, 3, 7A, 7B and 9, the "damper valve" (shown as 101 in FIG. 1) is considered as being comprised of fluid path 114, in combination with shim 116 and stiffness adjustment feature 118.

In the embodiment shown in FIG. 3, an internal clamping element 302 is used to retain the inner edge of shim 116 in place by contacting the inner diameter of shim 116 as shown at region 309 of internal clamping element 302. In one embodiment of the present invention, shim 116 is fixedly retained by internal clamping element 302 during assembly of damper piston assembly 200. In the present embodiment, the inner edge of shim 116 is restricted, by internal clamping element 302, from moving vertically (away from or toward) with respect to, for example, the top surface of piston 106. It should be noted that in embodiments of the present invention, and as described in detail below, under certain conditions, the outer edge of shim 116 will move, for example, away from the top surface of piston 106. Although shim 116 is not depicted as preloaded in the embodiment of FIG. 3, the present invention is also well suited to an embodiment in which shim 116 is, in fact, preloaded to obtain a desired shape or initial pre-bending of shim 116. Regardless of whether shim 116 is preloaded or is not preloaded, embodiments of the present invention are able to adjust the effective stiffness of shim 116 without requiring the application of a preload to shim 116, and without affecting any preload which may be applied to shim 116.

Referring still to FIG. 3, the embodiments of the present invention include a stiffness adjustment feature 118 (of FIG. 2) which is comprised of stiffness adjustment plate 202, spring component 204 and adjuster 206. Stiffness adjustment feature 118 is configured to adjust the effective stiffness of shim 116. Once again, for purposes of the present discussion, the effective stiffness of the shim, refers to the amount of force required to deflect shim 116.

Referring still to FIG. 3, stiffness adjustment feature 118 also includes a spring component 204. In the present embodiments, an inner edge of spring component 204, is restricted from moving vertically (away from or toward) with respect to, for example, the top surface of piston 106. It should be noted that in embodiments of the present invention, and as described in detail below, under certain conditions, an outer portion of spring component 204 will move, for example, away from the top surface of piston 106. Stiffness adjustment feature 118 also includes stiffness adjustment plate 202. Stiffness adjustment plate 202 includes a first surface (e.g., bottom surface of stiffness adjustment plate 202 in FIG. 3) which disposed facing shim 116, and a second surface (e.g., top surface of stiffness adjustment plate 202 in FIG. 3) which is disposed facing spring component 204. In the embodiment of FIG. 3, a shim engagement portion 304 extends from the first surface of stiffness adjustment plate 202. Shim engagement portion 304 is configured to engage with shim 116. In embodiments of the present invention, stiffness adjustment plate 202 is able to move vertically (away from or toward) with respect to, for example, the top surface of piston 106. More specifically, in embodiments of the present invention, stiffness adjustment plate 202 can be described as able to move axially with respect to the damper piston assembly 200. Moreover, in embodiments of the present invention, stiffness adjustment plate 202 is able to move axially, with respect to the damper piston assembly 200, between the location where the inner edge of shim 116 is retained and the location where the inner edge of spring component 204 is retained. Additionally, in the embodiment of FIG. 3, stiffness adjustment plate 202 includes a spring component engagement portion 306 (shown as 306a and 306b in FIG. 3) which extends from the second surface of stiffness adjustment plate 202. Spring component engagement portion 306 is configured to engage with spring component 204. As will be described in detail below, embodiments of the present invention are able to selectively vary the location at which spring component 204 engages with spring component engagement portion 306 of stiffness adjustment plate 202.

Figure 4A:
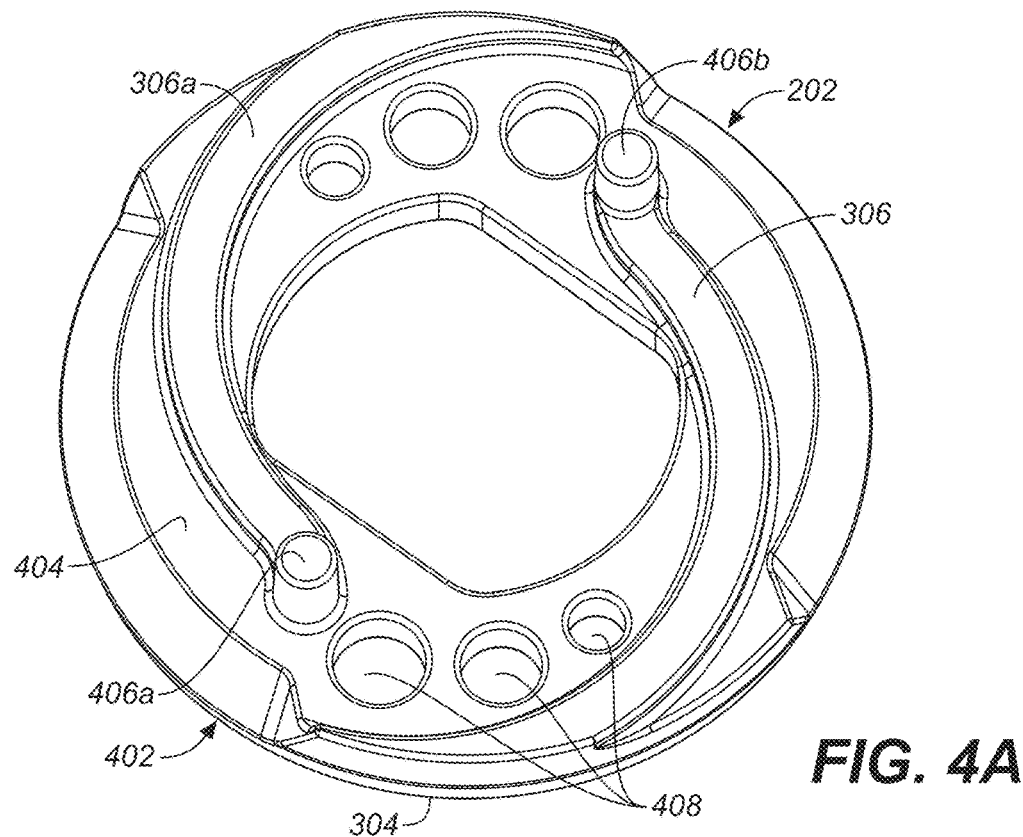
FIG. 4A is a perspective view of the stiffness adjustment plate, shown in FIG. 2 and FIG. 3, in accordance with an embodiment of the present invention.

With reference now to FIG. 4A, a perspective view of stiffness adjustment plate 202 of FIG. 2 and FIG. 3 is provided. As shown in FIG. 4A, in the present embodiment, stiffness adjustment plate 202 includes first surface 402 and second surface 404. Continuing with FIG. 4A, shim engagement portion 304 extends from first surface 402 of stiffness adjustment plate 202 and is configured to engage with shim 116 (of FIGS. 1-3). In one embodiment, shim engagement portion 304 is a rim or extension which extends from first surface 402 and about a circumference of stiffness adjustment plate 202. In one such embodiment, shim engagement portion 304 extends about the outermost circumference of stiffness adjustment plate 202. In embodiments of the present invention, shim engagement portion 304 is contiguous and extends completely around a circumference of stiffness adjustment plate 202. In other embodiments, shim engagement portion 304 is non-contiguous and extends at various locations from first surface 402. In one such non-contiguous embodiment, shim engagement portion 304 is comprised of cylindrical raised portions extending from first surface 402 of stiffness adjustment plate 202. In another non-contiguous embodiment, shim engagement portion 304 is comprised of a plurality of tabs or other projections extending from first surface 402 of stiffness adjustment plate 202. In some non-contiguous embodiments, the plurality of tabs or other projections extending from first surface 402 are evenly dispersed about a circumference of stiffness adjustment plate 202.

With reference still to FIG. 4A, in one embodiment, shim engagement portion 304 engages the outer circumference of shim 116 (of FIGS. 1-3). In various other embodiments, shim engagement portion 304 engages shim 116 at a location other than the outer circumference of shim 116. In various embodiments of the present invention, when shim 116 is not being deflected (e.g., when the damper valve 101 is closed), shim engagement portion 304 does not contact shim 116. Further, in various embodiments of the present invention, shim engagement portion 304 is spaced apart from shim 116 such that shim engagement portion 304 does not contact shim 116 until shim 116 has been deflected a certain distance. In various embodiments of the present invention, when shim 116 is not being deflected, shim engagement portion 304, does not alter an existing force which acts upon shim 116. That is, in various embodiments of the present invention, when shim 116 is not being deflected (e.g., when the damper valve 101 is closed), shim engagement portion 304 does not apply any force on shim 116 toward (or away from) piston 106 (of FIGS. 1-3).

Referring still to FIG. 4A, stiffness adjustment plate 202 includes a spring component engagement portion 306 (shown as 306a and 306b in FIG. 4A) which extends from second surface 404. Spring component engagement portion 306 is configured to engage with spring component 204 (of FIG. 2 and FIG. 3). In various embodiments, spring component engagement portion 306 is comprised of a single, continuous, helical pattern which spirals away from the axial center of stiffness adjustment plate 202. In various embodiments of the present invention, stiffness adjustment plate includes posts, shown as 406a and 406b. In various embodiments of the present invention, posts 406a and 406b provide a stopping or limiting point for the rotation of spring component 204 with respect to stiffness adjustment plate 202. Further, in various embodiments of the present invention, stiffness adjustment plate 202 includes openings, typically shown as 408. In some embodiments, openings 408 are included within stiffness adjustment plate 202 to prevent the entrapment of gas or fluid (e.g., air or damping fluid, respectively) between bottom surface 402 of stiffness adjustment plate 202 and an underlying top surface of a shim such as, for example, shim 116.

Figure 4B:
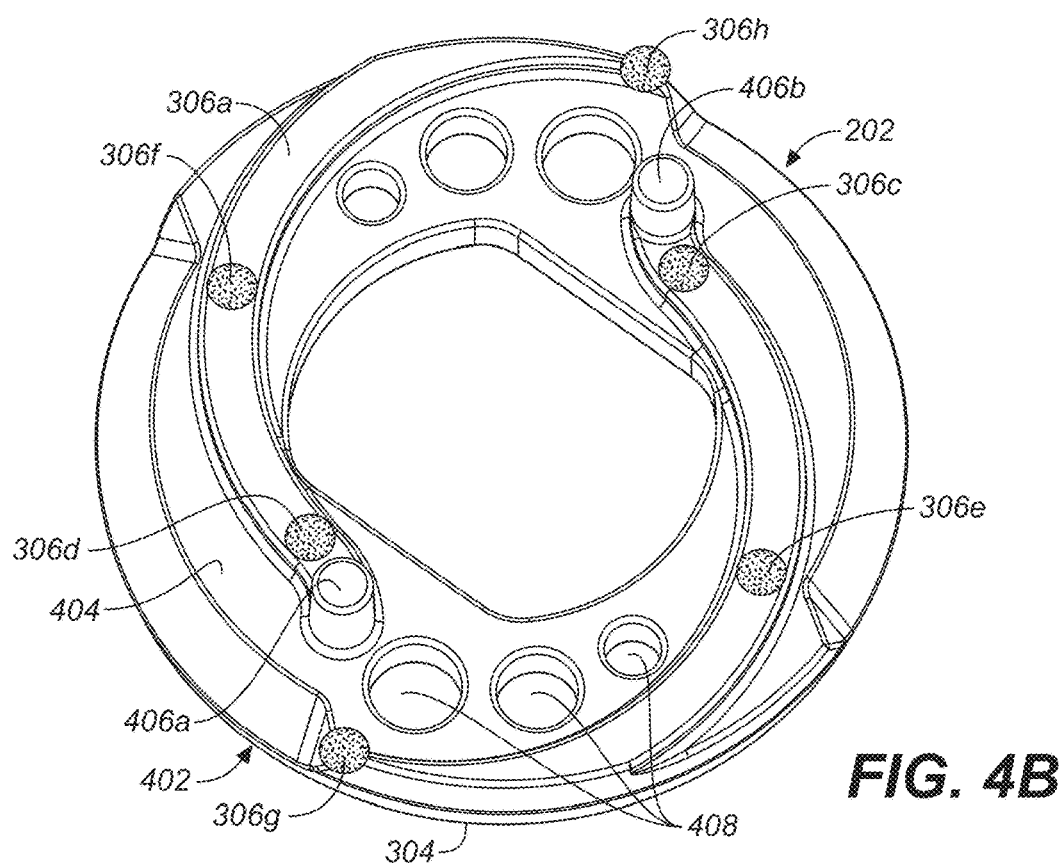
FIG. 4B is a perspective view of another embodiment of the stiffness adjustment plate, shown in FIG. 2 and FIG. 3, in accordance with the present invention.

Referring now to FIG. 4B, a perspective view of another embodiment of stiffness adjustment plate 202 of FIG. 2 and FIG. 3 is provided. As shown in FIG. 4B, in various other embodiments, spring component engagement portion 306 is comprised of a plurality of raised portions (306c-306h) disposed on second surface 404 in a variety of patterns located at discrete radii from the axial center of the stiffness adjustment plate 202. In one embodiment of FIG. 4B, plurality of raised portions (306c-306h) includes a first pair of projections (306c and 306d) disposed at a first radius from the center of stiffness adjustment plate 202. The embodiment of FIG. 4B further includes a second pair of projections (306e and 306f) disposed at a second radius from the center of stiffness adjustment plate 202, wherein the second radius is greater than the first radius. The embodiment of FIG. 4B further includes a third pair of projections (306g and 306h) disposed at a third radius from the center of stiffness adjustment plate 202 wherein the third radius is greater than the second radius. In one embodiment such as that depicted in FIG. 4B, a first member of the pair of projections is disposed 180 degrees opposite the corresponding second member of the same pair. Additionally, in one embodiment, a first pair of projections is disposed at a first radius, and the first member of the first pair is located within 1-120 degrees of the 360 degrees which comprise stiffness adjustment plate 202. Further, in the embodiment discussed immediately above, a second pair of projections is disposed at a second radius, and the first member of the second pair is located within 121-240 degrees of the 360 degrees which comprise stiffness adjustment plate 202. Further, still, in the embodiment discussed immediately above, a third pair of projections is disposed at a third radius, and the first member of the third pair is located within 241-360 degrees of the 360 degrees which comprise stiffness adjustment plate 202. It should be understood that the present invention is also well suited to various other configurations for spring component engagement portion 306, and that the embodiments depicted in FIGS. 4A and 4B, and others described above, are not intended to limit, or comprise an exhaustive recitation of, embodiments of spring component engagement portion 306.

Figure 5:
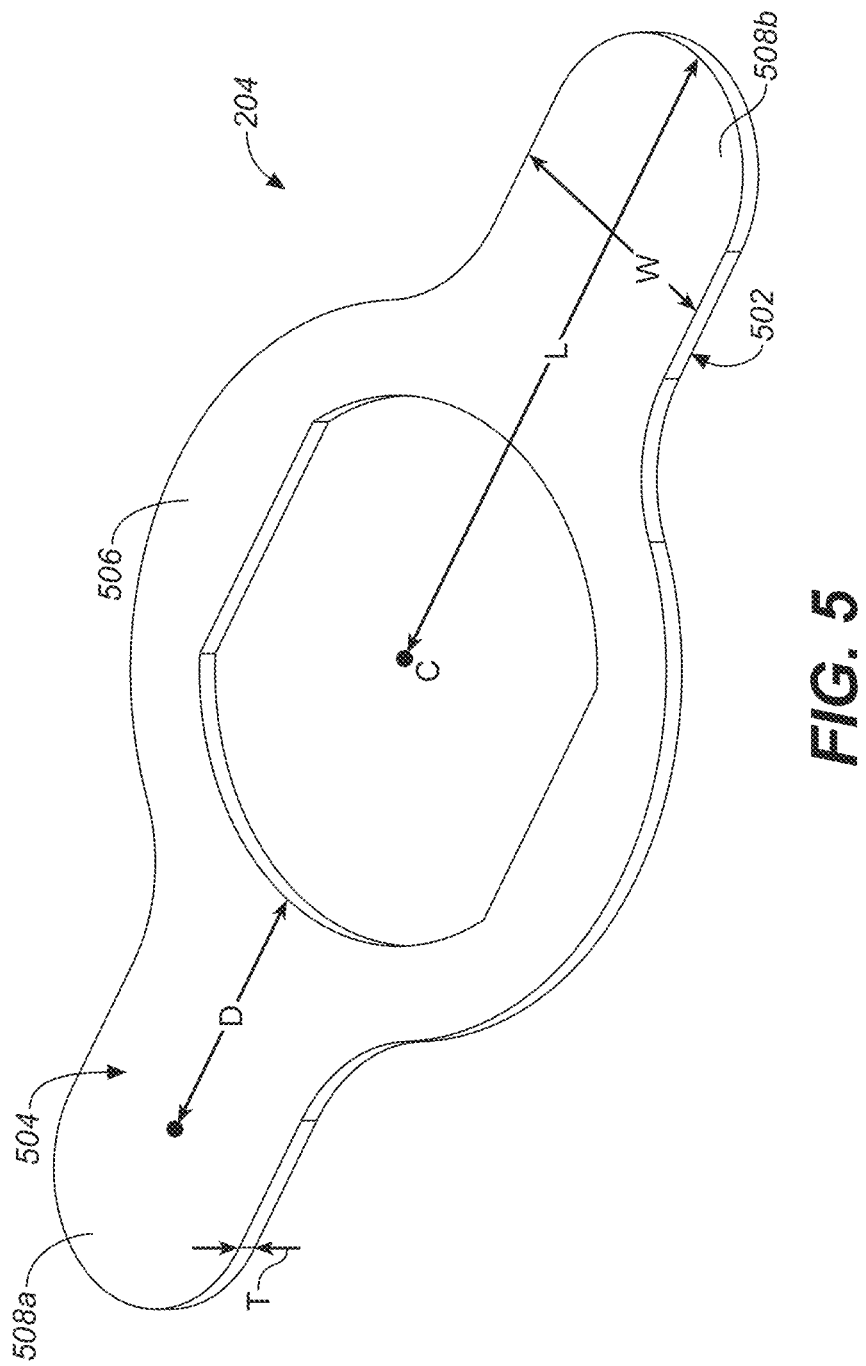
FIG. 5 is a perspective view of the spring component, shown in FIG. 2 and FIG. 3, in accordance with an embodiment of the present invention.

Referring now to FIG. 5, a perspective view of spring component 204, of FIG. 2 and FIG. 3, is provided, in accordance with an embodiment of the present invention. In the present embodiment, spring component 204 includes a first surface 502, a second surface 504, a hub 506, and extending portions also referred to as wings, shown as 508a and 508b in FIG. 5. In the present embodiment, each of wings 508a and 508b extends radially away from hub 506. In one embodiment of the present invention, spring component 204 includes more than a single wing. More specifically, in the embodiment of FIG. 5, spring component 204 includes two wings, 508a and 508b, which are spaced 180 degrees apart. In the present embodiment, each of wings 508a and 508b has a length, L, measured from an imaginary axis of the axial center, C, of hub 506. Additionally, in the present embodiment, each of wings 508a and 508b has a width W measured perpendicular to length, L, to form a plane which is parallel to first surface 502 and second surface 504. In one embodiment, first surface 502 and second surface 504 are separated by a thickness, T, of spring component 204. In various embodiments of the present invention, the thickness, T, and the material type used to form spring component 204 is selected to elicit a desired spring rate for spring component 204. In spring component 204, the force required to flex or bend wing 508a, and/or wing 508b, with respect to center, C, varies based on length of a moment arm measured, for example, from center, C, to the point on wing 508a, and/or 508b, where the force is applied. More specifically, in spring component 204, when a longer moment arm length is utilized, the force required to move a wing (508a or 508b) will be less than the force required to move a wing (508a or 508b) when a shorter moment arm length is utilized. For example, if a force is applied at the outer most edge of wing 508a (the longest possible moment arm length), the amount of force needed to move wing 508a will be at its lowest possible value. Correspondingly, the longer the moment arm, the lower the spring force provided by spring component 204 against movement of wing 508a. Conversely, if a force is applied at the inner most edge of wing 508a (the shortest possible moment arm length), the amount of force needed to move wing 508a will be at its highest possible value. Correspondingly, the shorter the moment arm, the greater the spring force provided by spring component 204 against movement of wing 508a.

Figure 6:
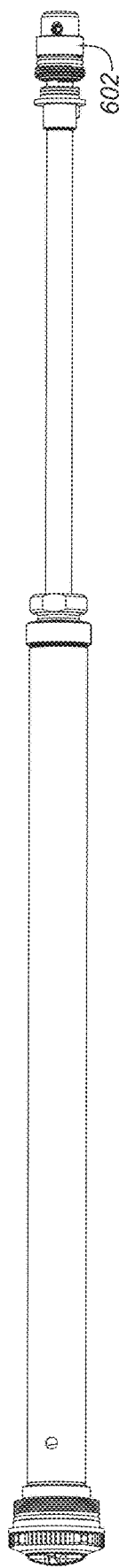
FIG. 6 is a perspective view of the suspension damper 100 (which was schematically depicted in FIG. 1), in accordance with an embodiment of the present invention.

FIG. 6 provides a perspective view of suspension damper 100 (which was schematically depicted in FIG. 1). Referring both to FIG. 3 and FIG. 6, adjuster 206 is coupled to spring component 204. Adjuster 206 is also coupled to threaded cylinder 308 which, in turn, is coupled to rod 310. In embodiments of the present invention, rod 310 is a low speed rebound needle. Additionally, in FIG. 3, a high speed rebound shaft 311 is shown. High speed rebound shaft 311 couples adjuster 206 and adjustment knob 602 (shown in FIG. 6. Movement of adjustment knob 602 causes rotation of high speed rebound shaft 311 and, correspondingly, rotation of adjuster 206. Rotation of adjuster 206 causes spring component 204 to rotate with respect to stiffness adjustment plate 202. Embodiments of the present invention describe that spring component 204 is rotated "with respect to" stiffness adjustment plate 202. It should be noted that the description of the present invention applies to, for example, embodiments in which rotation of adjuster 206 causes spring component 204 to rotate while stiffness adjustment plate 202 remains stationary. Additionally, the description of the present invention applies to, for example, embodiments in which rotation of adjuster 206 causes stiffness adjustment plate 202 to rotate while spring component 204 remains stationary. Thus, in the embodiment of FIG. 6, suspension damper 100 includes a damper valve (e.g., damper valve 101 of FIG. 1) in which stiffness adjustment feature 118 is manually adjustable. As will be described below in conjunction with the description of FIG. 11 and FIG. 12, in various embodiments of the present invention, damper valve (e.g., damper valve 101 of FIG. 1) includes stiffness adjustment feature 118 wherein stiffness adjustment feature 118 is automatically adjustable.

Figure 7A:
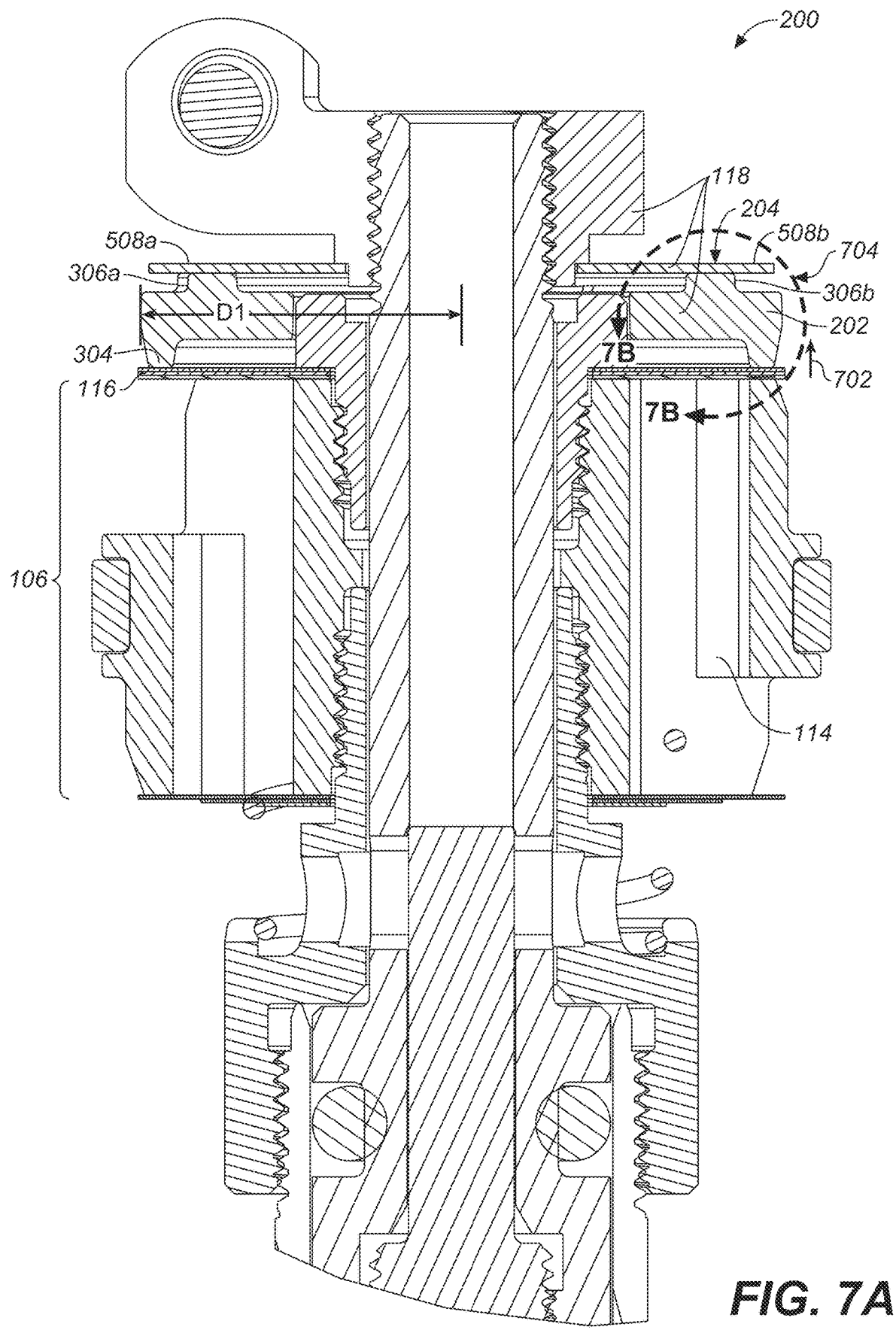
FIG. 7A is a side cut-away view of the damper piston assembly of FIG. 2 with the stiffness adjustment feature adjusting the effective stiffness of the shim by the lowest value possible for the stiffness adjustment feature, in accordance with an embodiment of the present invention.

Referring now to FIG. 7A, a side cut-away view is provided of damper piston assembly 200 with stiffness adjustment feature 118 adjusting the effective stiffness of shim 116 by the lowest value possible (for stiffness adjustment feature 118). With reference to FIG. 7A, and the various other Figures described above, operation of embodiments of the present invention are now described. In embodiments of the present invention, spring component 204 will generate a spring force as stiffness adjustment plate 202 is forced against spring component 204 due to deflection of shim 116. More specifically, in the event that damping fluid, for example, exerts sufficient force on shim 116, the outer edge of shim 116 will be deflected or bent upward, in a direction as indicated by arrow 702.

Figure 7B:
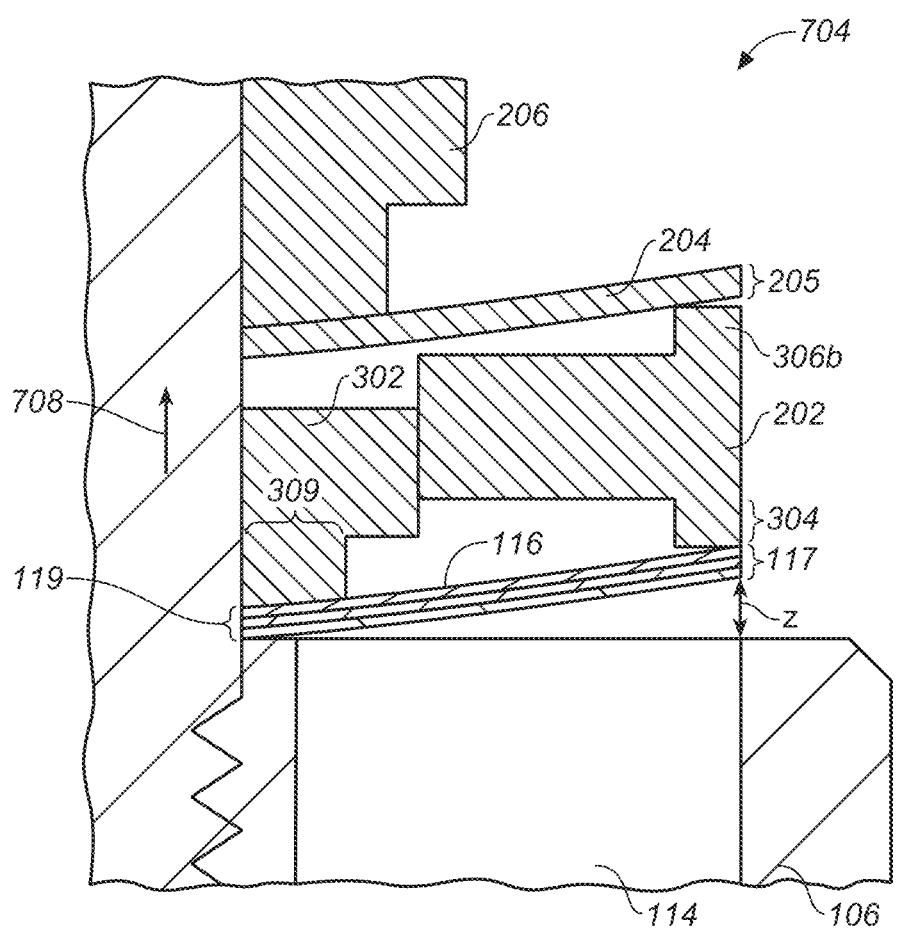
FIG. 7B is an enlarged view of region 704 of FIG. 7A when the shim is in a deflected position, in accordance with an embodiment of the present invention.

With reference now to FIG. 7B, an enlarged view of region 704 of FIG. 7A is provided with shim 116 in a deflected position. It should be noted that FIG. 7B is provided to explain aspects of embodiments of the present invention, and that FIG. 7B is not drawn to scale. In FIG. 7B, shim 116 is shown deflected or bent upward (for example, by a force exerted from damping fluid, not shown, present in fluid path 114 of piston 106). It will be understood that damping fluid can be described as exerting a pressure against shim 116. It will further be understood that the pressure exerted by the fluid over an area of shim 116 results in a force on shim 116. For purposes of the present application, the terms pressure and force may be used interchangeably, as is common in the art. When shim 116 is deflected or bent as shown in FIG. 7B, damping fluid, not shown, is able to flow (in an upward direction in the embodiment of FIGS. 7A and 7B) through fluid path 114 of piston 106 and past shim 116. It will further be understood that when shim 116 is deflected or bent, as shown in FIG. 7B, shim 116 can be described as deflected to an open position. Additionally, when shim 116 is deflected or bent, as shown in FIG. 7B, a damper valve which includes shim 116 may described as being "open" or in an open position.

As shown in FIG. 7B, in the present embodiment, the outer edge 117 (also referred to as an outer diameter) of shim 116 has been deflected upward a distance shown as Z. It should be again noted that in the present embodiment, region 309, of internal clamping element 302, retains the inner edge 119 (also referred to as an inner diameter) of shim 116 and thereby prevents inner edge 119 of shim 116 from moving vertically (away from or toward) with respect to, for example, the top surface of piston 106. Similarly, the inner edge (also referred to as the inner diameter) of spring component 204 is prevented from moving vertically (away from or toward) with respect to, for example, the top surface of piston 106. However, as described above in conjunction with the discussion of FIG. 3, in the present embodiment, stiffness adjustment plate 202 is able to move vertically (away from or toward) with respect to, for example, the top surface of piston 106. Moreover, in embodiments of the present invention, stiffness adjustment plate 202 is able to move axially, with respect to, for example, damper piston assembly 200, between the location where the inner edge of shim 116 is retained and the location where the inner edge of spring component 204 is retained. In the present embodiment, as outer edge 117 of shim 116 is deflected upward a distance Z, stiffness adjustment plate 202 is also moved upward (as indicated by arrow 708) a distance Z.

Referring still to FIG. 7B, the deflection of shim 116 by the distance Z forces the top surface of shim 116, at outer edge 117, against shim engagement portion 304 of stiffness adjustment plate 202, and move stiffness adjustment plate 202 upward the same distance Z. As stiffness adjustment plate 202 is moved upward, spring component engagement portion 306 (shown as 306b in FIG. 7B) of stiffness adjustment plate 202 is forced against the bottom surface of the outer edge 205 of spring component 204. Consequently, in the present embodiment, the upward motion of stiffness adjustment plate 202 by the distance Z, causes the outer edge 205 of spring component 204 to deflect upward by the same distance Z. In the present embodiments, spring component 204 provides a spring force against upward motion of stiffness adjustment plate 202. As a result, in embodiments of the present invention, the spring force generated by spring component 204 resists upward motion of stiffness adjustment plate 202, thereby also providing a resistive force against the deflection of shim 116. Hence, in the present embodiments, the resistive force applied (by stiffness adjustment feature 118) against the deflection of shim 116, increases the "effective stiffness" of shim 116.

Referring again to FIG. 7A, in embodiments of the present invention, the spring force provided by spring component 204 against upward motion of stiffness adjustment plate 202, and, therefore, deflection of shim 116 is dependent upon the location at which spring component engagement portion 306 contacts spring component 204. In the embodiment of FIG. 7A, spring component engagement portion 306 engages with spring component 204 at a distance, D1, which is at or near the outer edge of spring component 204. More specifically, in the embodiment of FIG. 7A, spring component engagement portion 306a engages with wing 508a of spring component 204 at a distance, D1, the greatest distance possible from the center, C, of spring component 204 (the longest possible moment arm). Similarly, spring component engagement portion 306b engages with wing 508b of spring component 204 at a distance, D1, also the greatest distance possible from the center, C, of spring component 204 (the longest possible moment arm). As a result, FIG. 7A depicts an embodiment of the present invention in which spring component 204 provide the least amount of resistance to upward movement of stiffness adjustment plate 202 and, correspondingly, the least amount of resistance to deflection of shim 116. As stated above, the "effective stiffness" of a shim, refers to the amount of force required to deflect the shim. Thus, in the embodiment of FIG. 7A, the amount of force applied by stiffness adjustment feature 118, to shim 116, to resist deflection of shim 116 is the least possible force which stiffness adjustment feature 118 can apply to shim 116. As a result, in the embodiment of FIG. 7A, stiffness adjustment feature 118 adjusts the effective stiffness of shim 116 by the least amount possible (for stiffness adjustment feature 118).

Figure 8A:
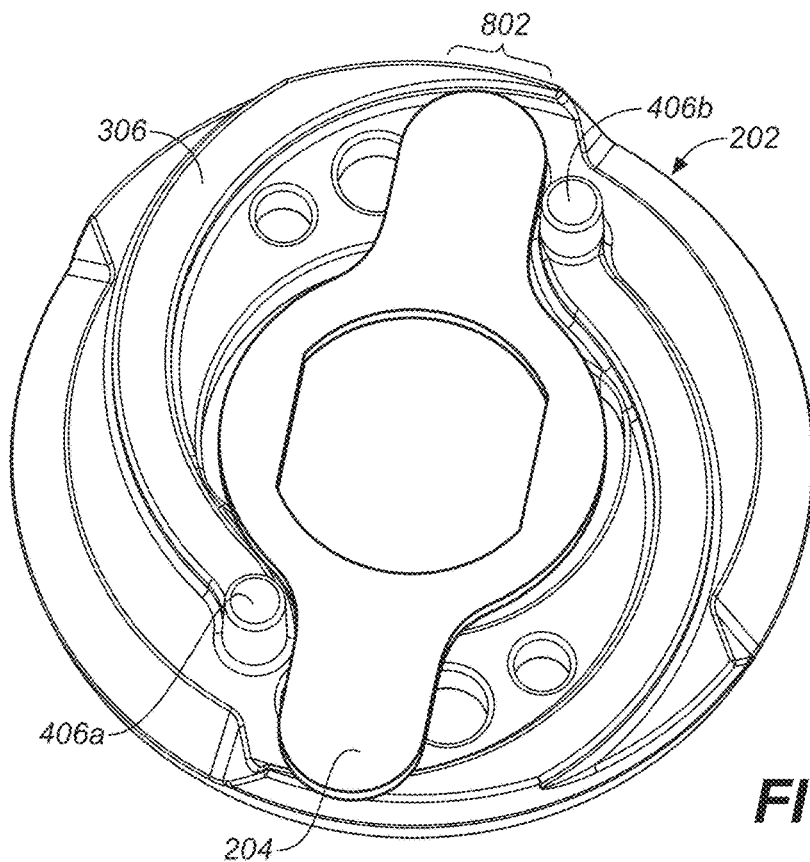
FIG. 8A is a perspective view of the spring component rotated, with respect to the stiffness adjustment plate, to the orientation depicted in FIGS. 7A and 7B, in accordance with an embodiment of the present invention.

Referring briefly to FIG. 8A, a perspective view is provided wherein adjustment knob 602, for example, has been adjusted to cause rotation of high speed rebound shaft 311 and, correspondingly, rotation of adjuster 206, such that spring component 204 is rotated, with respect to stiffness adjustment plate 202, to the orientation depicted in FIG. 7A. That is, in FIG. 8A, spring component 204 is rotated with respect to stiffness adjustment plate 202 such that spring component 204 contacts spring component engagement portion 306 at a first location 802. In the embodiment of FIG. 8A, when stiffness adjustment plate 202 engages with first location 802 of spring component engagement portion 306, stiffness adjustment feature 118 will adjust the effective stiffness of shim 116 by the least amount possible (for stiffness adjustment feature 118). Moreover, FIG. 8A, corresponds to the embodiment of FIG. 7A in which stiffness adjustment plate 202 and spring component 204 are oriented with respect to each other such that stiffness adjustment plate 202 engages with first location 802 of spring component engagement portion 306, and such that spring component 204 applies the least amount of force it can against movement of stiffness adjustment plate 202 towards spring component 204. In the embodiment of FIG. 8A, posts 406a and 406b, of stiffness adjustment plate 202, provide a stopping or limiting point for the rotation of spring component 204 with respect to stiffness adjustment plate 202.

Figure 9:
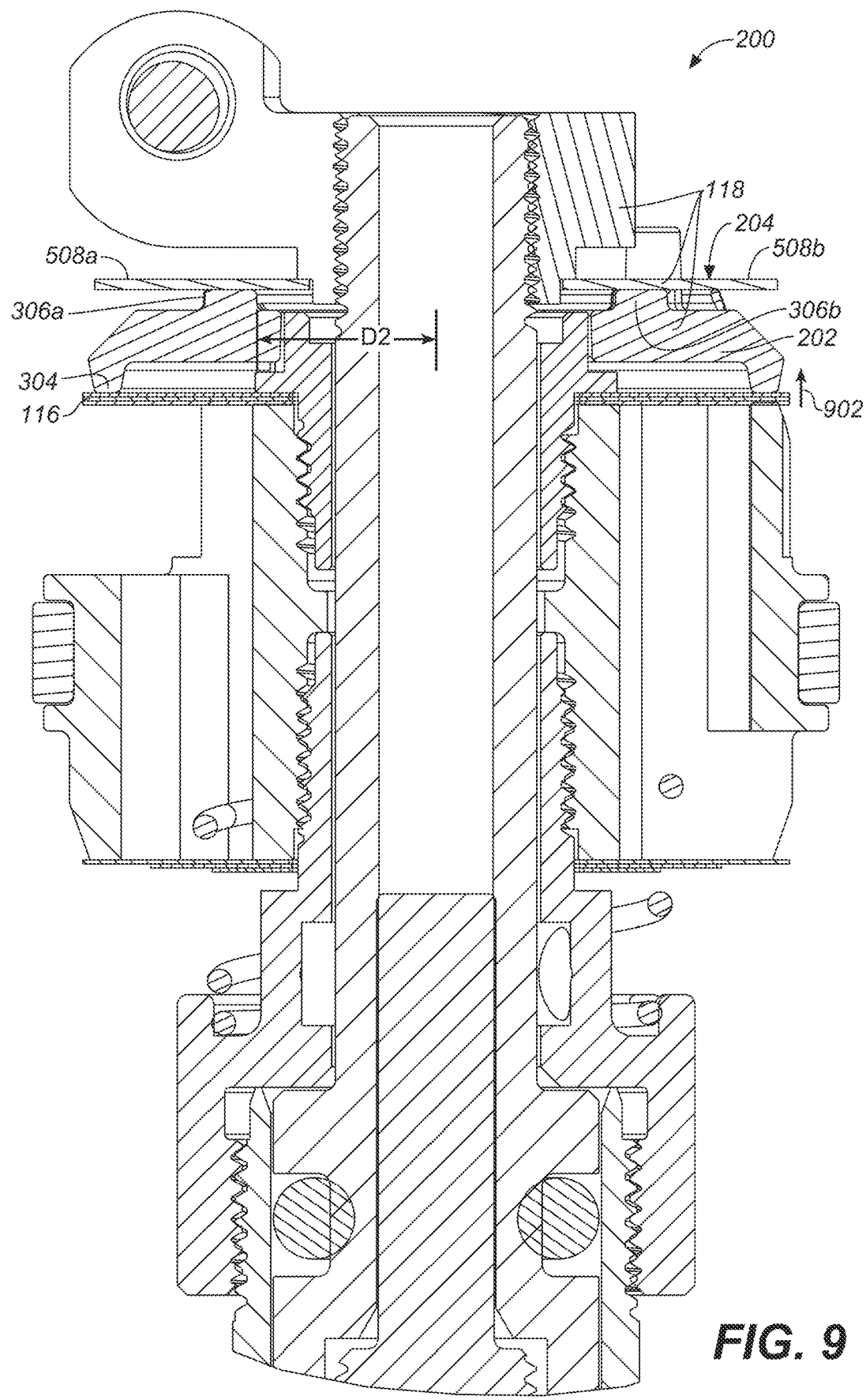
FIG. 9 is a side cut-away view of the damper piston assembly of FIG. 2 with the stiffness adjustment feature adjusting the effective stiffness of the shim by the highest value possible for the stiffness adjustment feature, in accordance with an embodiment of the present invention.

Referring now to FIG. 9, a side cut-away view is provided of damper piston assembly 200 with stiffness adjustment feature 118 adjusting the effective stiffness of shim 116 by the greatest value possible (for stiffness adjustment feature 118). In the embodiments of the present invention, movement of adjustment knob 602 and corresponding rotational movement of spring component 204 with respect to stiffness adjustment plate 202 varies the location at which spring component 204 engages with spring component engagement portion 306 of stiffness adjustment plate 202. In the embodiment of FIG. 7A, spring component 204 was rotated with respect to stiffness adjustment plate 202 such that spring component 204 engaged with spring component engagement portion 306 at a distance, D1, the greatest distance possible from the center, C, of spring component 204 (the longest possible moment arm). In the present embodiment, as depicted in FIG. 9, spring component 204 is rotated with respect to stiffness adjustment plate 202 such that spring component 204 engages with spring component engagement portion 306 at a distance, D2, the shortest distance possible from the center, C, of spring component 204 (the shortest possible moment arm). As in the embodiment of FIG. 7A, and as similar to the description provided in conjunction with FIG. 7B, spring component 204 will generate a spring force as stiffness adjustment plate 202 is forced against spring component 204 due to deflection of shim 116. Thus, and as described above, spring component 204 provides a spring force against upward motion of stiffness adjustment plate 202. As a result, in embodiments of the present invention, the spring force generated by spring component 204 resists upward motion of stiffness adjustment plate 202, thereby also providing a resistive force against the deflection of shim 116. Hence, in the present embodiments, any additional resistive force applied (by stiffness adjustment feature 118) against the deflection of shim 116, increases the "effective stiffness" of shim 116.

Referring still to FIG. 9, in embodiments of the present invention, the spring force provided by spring component 204 against upward motion of stiffness adjustment plate 202, and, therefore, deflection of shim 116 is dependent upon the location at which spring component engagement portion 306 contacts spring component 204. In the embodiment of FIG. 9, spring component engagement portion 306 engages with spring component 204 at a distance, D2, which is at or near the inner edge of spring component 204. More specifically, in the embodiment of FIG. 9, spring component engagement portion 306a engages with wing 508a of spring component 204 at a distance, D2, the shortest distance possible from the center, C, of spring component 204 (the shortest possible moment arm). Similarly, spring component engagement portion 306b engages with wing 508b of spring component 204 at a distance, D2, also the shortest distance possible from the center, C, of spring component 204 (the shortest possible moment arm). As a result, FIG. 9 depicts an embodiment of the present invention in which spring component 204 provide the greatest amount of resistance to upward movement of stiffness adjustment plate 202 and, correspondingly, the greatest amount of resistance to deflection of shim 116. Again, the "effective stiffness" of a shim, refers to the amount of force required to deflect the shim. Thus, in the embodiment of FIG. 9, the amount of force applied by stiffness adjustment feature 118, to shim 116, to resist deflection of shim 116 is the greatest possible force which stiffness adjustment feature 118 can apply to shim 116. As a result, in the embodiment of FIG. 9, stiffness adjustment feature 118 adjusts the effective stiffness of shim 116 by the greatest amount possible (for stiffness adjustment feature 118).

Figure 8B:
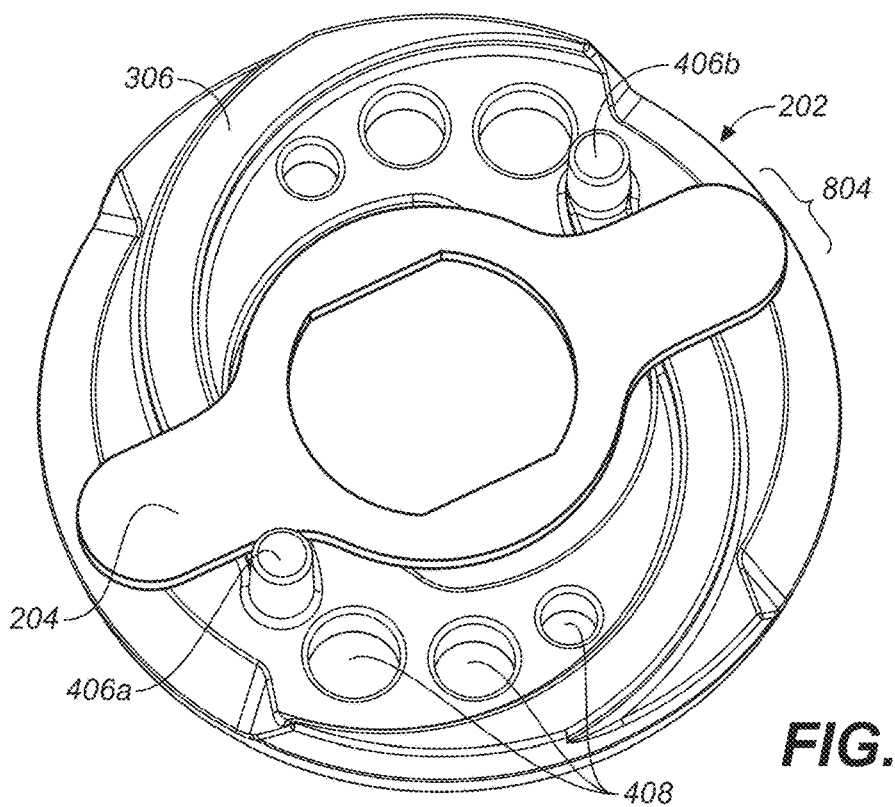
FIG. 8B is a perspective view of the spring component rotated, with respect to the stiffness adjustment plate, to the orientation depicted in FIG. 9, in accordance with an embodiment of the present invention.

Referring briefly to FIG. 8B, a perspective view is provided wherein adjustment knob 602, for example, has been adjusted to cause rotation of high speed rebound shaft 311 and, correspondingly, rotation of adjuster 206, such that spring component 204 is rotated, with respect to stiffness adjustment plate 202, to the orientation depicted in FIG. 9. That is, in FIG. 8B, spring component 204 is rotated with respect to stiffness adjustment plate 202 such that spring component 204 contacts spring component engagement portion 306 at a second location 804. In the embodiment of FIG. 8B, when stiffness adjustment plate 202 engages with second location 804 of spring component engagement portion 306, stiffness adjustment feature 118 will adjust the effective stiffness of shim 116 by the greatest amount possible (for stiffness adjustment feature 118). Moreover, FIG. 8B, corresponds to the embodiment of FIG. 9 in which stiffness adjustment plate 202 and spring component 204 are oriented with respect to each other such that stiffness adjustment plate 202 engages with second location 804 of spring component engagement portion 306, and such that spring component 204 applies the greatest amount of force it can against movement of stiffness adjustment plate 202 towards spring component 204. In the embodiment of FIG. 8B, posts 406a and 406b, of stiffness adjustment plate 202, provide a stopping or limiting point for the rotation of spring component 204 with respect to stiffness adjustment plate 202.

Referring once again to FIG. 3, it will be seen that in the embodiment of FIG. 3, stiffness adjustment feature 118 is configured to adjust the effective stiffness of shim 116 by some value between the greatest value possible and the lowest value possible (for stiffness adjustment feature 118). In the embodiment of FIG. 3, spring component 204 is rotated with respect to stiffness adjustment plate 202 such that spring component 204 engages with spring component engagement portion 306 at a distance that is between D1, of FIG. 7A, and D2, of FIG. 9. Hence, the embodiment of FIG. 3 obtains a moment arm having a length which is between the longest and the shortest possible for stiffness adjustment feature 118. As in the embodiments of FIG. 7A and FIG. 9, and in the same manner as described in conjunction with the discussion of FIG. 7B, spring component 204 will generate a spring force as stiffness adjustment plate 202 is forced against spring component 204 due to deflection of shim 116. Again, and as described above in conjunction with FIG. 7B, spring component 204 provides a spring force against upward motion of stiffness adjustment plate 202. As a result, in embodiments of the present invention, the spring force generated by spring component 204 resists upward motion of stiffness adjustment plate 202, thereby also providing a resistive force against the deflection of shim 116. Hence, in the present embodiments, any additional resistive force applied (by stiffness adjustment feature 118) against the deflection of shim 116, increases the "effective stiffness" of shim 116.

Referring still to FIG. 3, in embodiments of the present invention, the spring force provided by spring component 204 against upward motion of stiffness adjustment plate 202, and, therefore, deflection of shim 116 is dependent upon the location at which spring component engagement portion 306 contacts spring component 204. As a result, FIG. 3 depicts an embodiment of the present invention in which spring component 204 provides a "mid-range" amount of resistance (between the greatest amount possible and the least amount possible) to upward movement of stiffness adjustment plate 202 and, correspondingly, the amount of resistance (between the greatest amount possible and the least amount possible) to deflection of shim 116. Again, the "effective stiffness" of a shim, refers to the amount of force required to deflect the shim. Thus, in the embodiment of FIG. 9, the amount of force applied by stiffness adjustment feature 118, to shim 116, to resist deflection of shim 116 is between the greatest possible force and least possible force which stiffness adjustment feature 118 can apply to shim 116. As a result, in the embodiment of FIG. 9, stiffness adjustment feature 118 adjusts the effective stiffness of shim 116 by an amount between the greatest amount possible and the least amount possible (for stiffness adjustment feature 118).

Figure 8C:
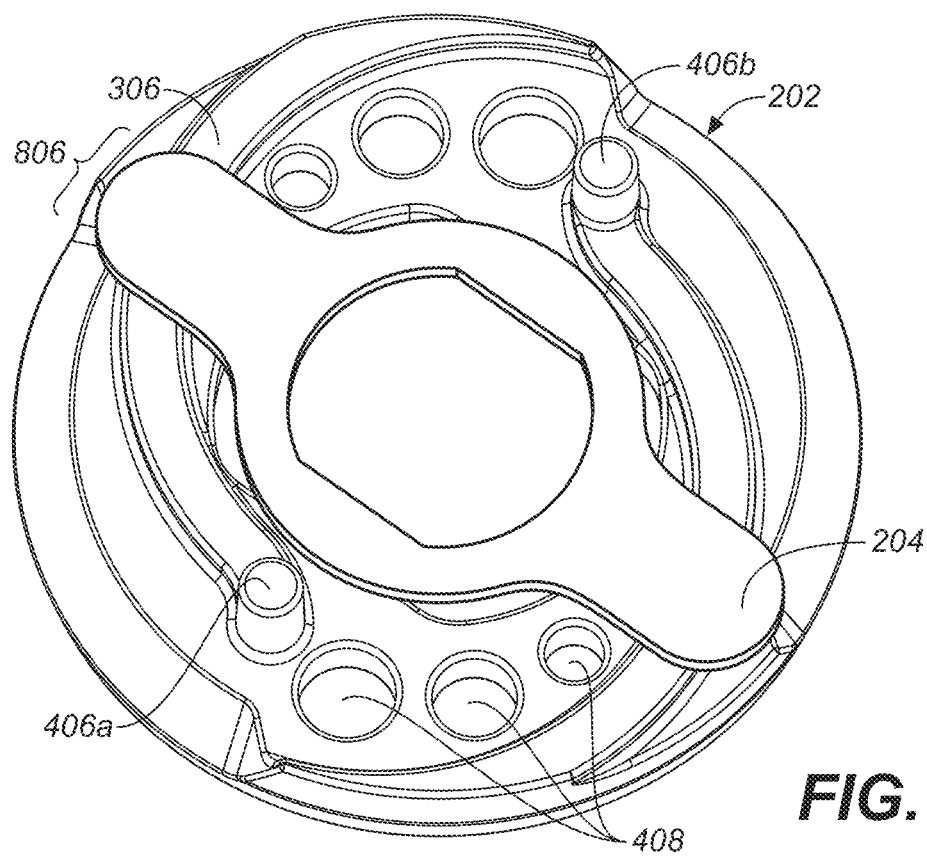
FIG. 8C is a perspective view of the spring component rotated, with respect to the stiffness adjustment plate, to the orientation depicted in FIG. 3, in accordance with an embodiment of the present invention.

Referring briefly to FIG. 8C, a perspective view is provided wherein adjustment knob 602, for example, has been adjusted to cause rotation of high speed rebound shaft 311 and, correspondingly, rotation of adjuster 206, such that spring component 204 is rotated, with respect to stiffness adjustment plate 202, to the orientation depicted in FIG. 3. That is, in FIG. 8C, spring component 204 is rotated with respect to stiffness adjustment plate 202 such that spring component 204 contacts spring component engagement portion 306 at a third location 806. In the embodiment of FIG. 8C, when stiffness adjustment plate 202 engages with third location 806 of spring component engagement portion 306, stiffness adjustment feature 118 will adjust the effective stiffness of shim 116 by an amount which is between the greatest and the least amount possible (for stiffness adjustment feature 118). Moreover, FIG. 8C, corresponds to the embodiment of FIG. 3 in which stiffness adjustment plate 202 and spring component 204 are oriented with respect to each other such that stiffness adjustment plate 202 engages with third location 806 of spring component engagement portion 306, and such that spring component 204 applies an amount of force against movement of stiffness adjustment plate 202 towards spring component 204 wherein the amount of force is somewhere between the greatest amount of force and the least amount of force possible.

In embodiments of the present invention, stiffness adjustment feature 118 is infinitely adjustable between the orientation shown in FIG. 7A (adjusting the effective stiffness of shim 116 by the least amount possible (for stiffness adjustment feature 118)) and the orientation shown in FIG. 9 (adjusting the effective stiffness of shim 116 by the greatest amount possible (for stiffness adjustment feature 118)). In such an embodiment, the present invention provides a damper valve 101 in which the effective stiffness of shim 116 is infinitely adjustable from the least amount possible to the greatest amount possible (for stiffness adjustment feature 118).

In various other embodiments of the present invention, stiffness adjustment feature 118 includes a plurality of discrete settings wherein at least some of discrete settings each correspond to a different amount of adjustment to the effective stiffness for shim 116. In one such embodiment, a spring-loaded ball and detent assembly (shown as 320 in FIG. 3), is coupled with high speed rebound shaft 311 and adjustment knob 602 to create a plurality discrete positions for adjuster 206, and, as a result, a corresponding plurality of discrete rotational orientations of spring component 204 with respect to stiffness adjustment plate 202. In such an embodiment, the present invention provides a damper valve 101 in which the effective stiffness of shim 116 is adjustable (by a plurality of discrete/differing settings) which can range from the least amount of adjustment possible to the greatest amount of adjustment possible (for stiffness adjustment feature 118).

In the present embodiments, the amount by which stiffness adjustment feature 118 can adjust the effective stiffness of a shim, such as, for example, shim 116 will be determined, and can be varied, based upon the features, dimensions, and other characteristics of the components comprising stiffness adjustment feature 118. As an example, if spring component 204 is replaced with a spring component having a greater spring constant (i.e., a greater resistive force against bending), with all other components of stiffness adjustment feature 118 remaining the same, stiffness adjustment feature 118 would then be capable of generating a greater resistance to upward movement of stiffness adjustment plate 202. As a result, the amount by which stiffness adjustment feature 118 could increase the effective stiffness of shim 116 would be increased. In embodiments of the present invention, stiffness adjustment feature 118 is altered, for example, by changing the dimensions of stiffness adjustment plate 202. These above examples are provided to illustrate various possible embodiments in which stiffness adjustment feature 118 is altered, and the above examples are not intended to be a limiting or exhaustive list of various possible alterations to stiffness adjustment feature 118.

Additionally, as described above, stiffness adjustment feature 118 is configured such that movement of stiffness adjuster feature 118 (e.g., rotational movement of spring component 204 with respect to stiffness adjustment plate 202, rotation of adjuster 206) ultimately varies the effective stiffness of shim 116 without altering any existing force which acts upon shim 116. For example, in embodiments of the present invention, components of stiffness adjuster feature 118 can be moved or adjusted without imparting a preload to shim 116 and without affecting any preload which may have been applied to shim 116. Further, stiffness adjustment feature 118 is configured such that movement of stiffness adjuster feature 118 (e.g., rotational movement of spring component 204 with respect to stiffness adjustment plate 202, rotation of adjuster 206) ultimately varies the effective stiffness of shim 116 without moving shim 116 toward or away from piston 106. For example, in embodiments of the present invention, components of stiffness adjuster feature 118 can be moved or adjusted without moving shim 116 "downward" further against piston 106, and without moving shim 116 "upward" away from piston 106.

Figure 10:
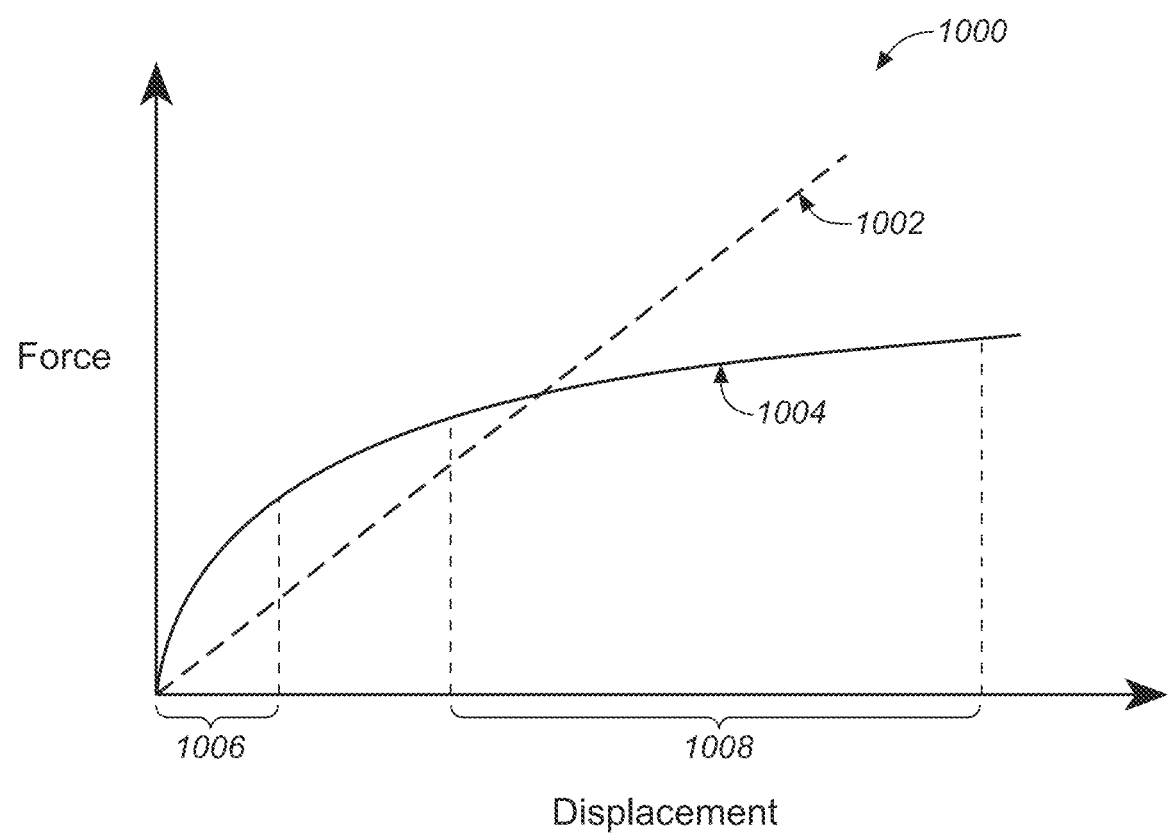
FIG. 10 is a simplified representative graph of Force versus Displacement for a damper valve, in accordance with an embodiment of the present invention.

Referring now to FIG. 10, a simplified representative graph 1000 of Force versus Displacement for a damper valve is provided. Typically, a graph of Force versus Displacement (or sometimes "Velocity") for a damper valve is referred to the damping characteristic curve of the damper valve. In graph 1000, dotted line 1002 represents what is commonly referred to as an "ideal" damping characteristic curve for a damper valve. As shown in graph 1000, an ideal damping characteristic curve is typically linear. This means that, for a damper valve having a corresponding ideal damping characteristic curve, the amount of force applied to a damper valve (e.g., to a shim by damping fluid) is linearly related to the displacement of the damper valve (e.g., how much the shim is deflected). In FIG. 10, solid line 1004 represents a damping characteristic curve for a conventional damper valve having a preload applied to the shim. As stated above, many conventional damper valves attempt to increase the amount of force required to further open or further deflect or bend the shim during high-speed operation (e.g., during a greater fluid flow rate through the damper valve), by applying a preload to the shim. Such high-speed operation is depicted, for example, at region 1008 of graph 1000. However, as stated above, when conventional damper valves have a preload applied to the shim, a greater initial force is required to deflect or bend the preloaded shim and open the damper valve. This greater initial force, required to deflect or bend the preloaded shim and open the damper valve, is illustrated by region 1006 of solid line 1004. More specifically, the steep slope of solid line 1004 in region 1006, as compared to the slope of dotted line 1002 in region 1006, indicates that the preloading associated with many conventional dampers clearly affects the force required to initially open the damper valve. The steep slope or initial non-linearity shown in region 1006, for solid line 1004, is typically referred to as the "nose" of the damping characteristic curve. In practice, this means that when conventional dampers attempt to adjust high-speed behavior of a damper valve (e.g., within region 1008) by applying a preload to the shim, the low-speed behavior of the damper valve (e.g., within region 1006) is heavily influenced.

Referring still to FIG. 10, as described above, embodiments of the present invention provide a damper valve having an adjustable effective stiffness for shim wherein the effective stiffness for the shim is adjustable without requiring the user to apply a preload to the shim. Thus, embodiments of the present invention enable adjustments to the high-speed behavior of a damper valve (e.g., within region 1008), by varying the effective stiffness of a shim, without heavily or disproportionately influencing the low-speed behavior of the damper valve (e.g., within region 1006). As a result, embodiments of the present invention provide an adjustable damper valve, having a corresponding damping characteristic curve, wherein adjustments to an effective stiffness of the damper valve do not impose an initial non-linearity to the corresponding damping characteristic curve. Additionally, in embodiments of the present invention, adjustments made to increase the effective stiffness of a shim will generally uniformly increase the slope of damper valve's corresponding damping characteristic curve. Thus, in embodiments of the present invention, the effective stiffness of a shim can be adjusted to tailor a corresponding damping characteristic curve to more closely approximate an ideal damping characteristic curve.

It should again be noted, that although various embodiments of the present invention adjust an effective stiffness of a shim without affecting a preload applied to the shim, embodiments of the present invention are also able to adjust an effective stiffness of a shim without affecting an existing preload which is applied to the shim. That is, embodiments of the present invention are also well suited to adjusting an effective stiffness of a shim in a damper valve, wherein the shim has a preload applied thereto.

Figure 11:
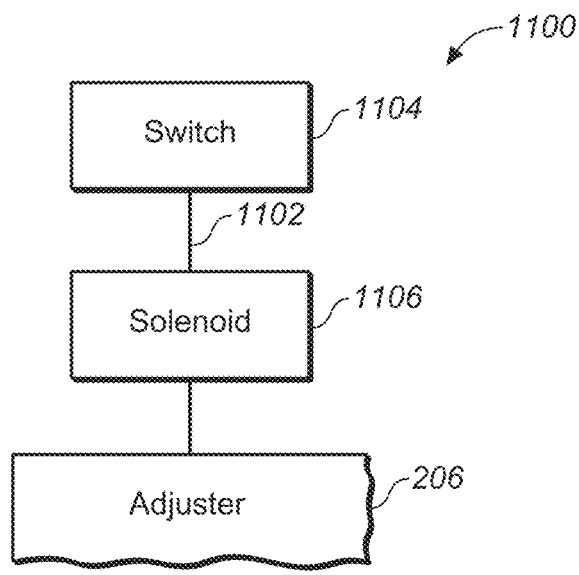
FIG. 11 is a schematic diagram of a system in which the stiffness adjustment feature is automatically adjustable, in accordance with an embodiment of the present invention.

Referring now to FIG. 11, as mentioned above, in various embodiments of the present invention, damper valve (e.g., damper valve 101 of FIG. 1) includes stiffness adjustment feature 118, wherein stiffness adjustment feature 118 is automatically adjustable. In one such embodiment, adjuster 206 is solenoid operated, hydraulically operated, pneumatically operated, or operated by any other suitable motive mechanism. Adjuster 206 may be operated remotely by a switch or potentiometer located in the cockpit of a vehicle or attached to appropriate operational parts of a vehicle for timely activation (e.g. brake pedal) or may be operated in response to input from a microprocessor (e.g. calculating desired settings based on vehicle acceleration sensor data) or any suitable combination of activation means. In like manner, a controller for adjuster 206 may be cockpit mounted and may be manually adjustable or microprocessor controlled or both or selectively either.

It may be desirable to increase the damping rate or effective stiffness of a damper valve of a suspension damper) when moving a vehicle from off-road to on highway use. Off-road use often requires a high degree of compliance to absorb shocks imparted by the widely varying terrain. On highway use, particularly with long wheel travel vehicles, often requires more rigid shock absorption to allow a user to maintain control of a vehicle at higher speeds. This may be especially true during cornering or braking One embodiment comprises a four-wheeled vehicle having a suspension damper (equipped with stiffness adjustment feature 118) at each (of four) wheel. The stiffness adjustment feature 118 (including, for example, a remotely controllable adjuster 206) of each of the front shock absorbers may be electrically connected with a linear switch (such as that which operates an automotive brake light) that is activated in conjunction with the vehicle brake pedal. When the brake pedal is depressed beyond a certain distance, corresponding usually to harder braking and hence potential for vehicle nose dive, the electric switch connects a power supply to a motive force generator for adjuster 206 in each of the front shocks thereby increasing the effective stiffness of the damper valve in those shocks. As such, the front shocks become more rigid during hard braking. Other mechanisms may be used to trigger the shocks such as accelerometers (e.g. tri-axial) for sensing pitch and roll of the vehicle and activating, via a microprocessor, the appropriate amount of rotation of adjuster 206 (and corresponding adjustment of the effective stiffness for the corresponding damper valve) for optimum vehicle control.

In one embodiment, a vehicle steering column includes right turn and left turn limit switches such that a hard turn in either direction activates the appropriate amount of rotation of adjuster 206 (and corresponding adjustment of the effective stiffness for the corresponding damper valve) of shocks opposite that direction (for example, a hard, right turn would cause more rigid shocks on the vehicle's left side). Again, accelerometers in conjunction with a microprocessor and a switched power supply may perform the adjuster 206 activation function by sensing the actual g-force associated with the turn (or braking; or throttle acceleration for the rear shock activation) and triggering the appropriate amount of rotation of adjuster 206 (and corresponding adjustment of the effective stiffness for the corresponding damper valve) at a preset threshold g-force.

FIG. 11 is a schematic diagram showing a control arrangement 1100 for a remotely-operated adjuster 206. As illustrated, a signal line 1102 runs from a switch 1104 to a solenoid 1106. Thereafter, the solenoid 1106 converts electrical energy into mechanical movement and shifts position of adjuster 206, thereby adjusting stiffness adjustment feature 118 and varying the effective stiffness of a corresponding damper valve. While FIG. 11 is simplified and involves control of a single adjuster 206, it will be understood that any number of adjusters corresponding to any number of stiffness adjustment features for a corresponding number of damper valves could be operated simultaneously or separately depending upon needs in a vehicular suspension system. Additional switches could permit individual operation of separate remotely-operable adjusters.

As discussed, a remotely-operable adjuster 206 like the one described above is particularly useful with an on-/off-road vehicle. These vehicles can have as more than 20" of shock absorber travel to permit them to negotiate rough, uneven terrain at speed with usable shock absorbing function. In off-road applications, compliant dampening is necessary as the vehicle relies on its long travel suspension when encountering often large off-road obstacles. Operating a vehicle with very compliant, long travel suspension on a smooth road at higher speeds can be problematic due to the springiness/sponginess of the suspension and corresponding vehicle handling problems associated with that (e.g. turning roll, braking pitch). Such compliance can cause reduced handling characteristics and even loss of control. Such control issues can be pronounced when cornering at high speed as a compliant, long travel vehicle may tend to roll excessively. Similarly, such a vehicle may pitch and yaw excessively during braking and acceleration. With the remotely-operated adjuster 206, the effective stiffness and, correspondingly, the dampening characteristics of a shock absorber can be changed for higher speeds on a smooth road.

Figure 12:
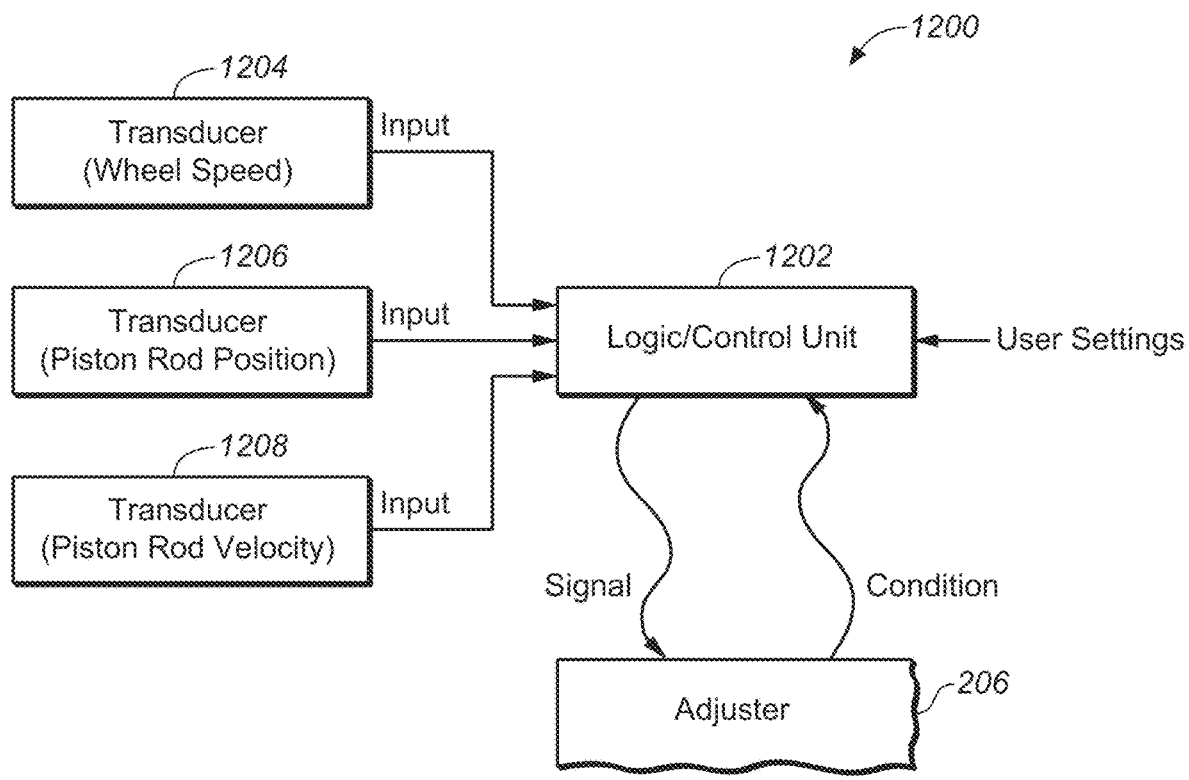
FIG. 12 is a schematic diagram of a system in which the stiffness adjustment feature is automatically adjustable and showing a logic unit and various transducers for providing input to the logic unit, in accordance with an embodiment of the present invention.

In addition to, or in lieu of, the simple, switch-operated remote arrangement of FIG. 11, the remotely-operable adjuster 206 can be operated automatically based upon one or more driving conditions. FIG. 12 shows a schematic diagram of a remote-control system 1200 based upon any or all of vehicle speed, damper rod speed, and damper rod position. One embodiment of the arrangement of FIG. 12 is designed to automatically increase dampening in a shock absorber in the event a damper rod reaches a certain velocity in its travel towards the bottom end of a damper at a predetermined speed of the vehicle. In one embodiment, the system 1200 adds dampening (and control) in the event of rapid operation (e.g. high rod velocity) of the damper to avoid a bottoming out of the damper rod as well as a loss of control that can accompany rapid compression of a shock absorber with a relative long amount of travel. In one embodiment, the system 1200 adds dampening (e.g., increases the effective stiffness of the corresponding damper valve) in the event that the rod velocity in compression is relatively low but the rod progresses past a certain point in the travel. Such configuration aids in stabilizing the vehicle against excessive low-rate suspension movement events such as cornering roll, braking and acceleration yaw and pitch and "g-out."

FIG. 12 illustrates, for example, a system 1200 including three variables: wheel speed, corresponding to the speed of a vehicle (measured by wheel speed transducer 1204), piston rod position (measured by piston rod position transducer 1206), and piston rod velocity (measured by piston rod position transducer 1208). Any or all of the variables shown may be considered by logic unit 1202 in controlling the solenoids or other motive sources coupled to adjuster 206 for adjustment of a corresponding stiffness adjustment feature 118. Any other suitable vehicle operation variable may be used in addition to or in lieu of the variables 1204, 1206, and 1208 such as, for example, piston rod compression strain, eyelet strain, vehicle mounted accelerometer (or tilt/inclinometer) data or any other suitable vehicle or component performance data. In one embodiment, piston 106's position within damping chamber 104 (both of FIG. 1) is determined using an accelerometer to sense modal resonance of suspension damper 100. Such resonance will change depending on the position of piston 106 and an on-board processor (computer) is calibrated to correlate resonance with axial position. In one embodiment, a suitable proximity sensor or linear coil transducer or other electromagnetic transducer is incorporated in the damping chamber 104 to provide a sensor to monitor the position and/or speed of piston 106 (and suitable magnetic tag) with respect to housing 102 of suspension damper 100. In one embodiment, the magnetic transducer includes a waveguide and a magnet, such as a doughnut (toroidal) magnet that is joined to the cylinder and oriented such that the magnetic field generated by the magnet passes through rod 108 and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines. By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, either digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper 100 measure piston rod velocity (piston rod velocity transducer 1208), and piston rod position (piston rod position transducer 1206), a separate wheel speed transducer 1204 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 12, the logic unit 1202 with user-definable settings, receives inputs from piston rod position transducer 1206, piston rod velocity transducer 1208, as well as wheel speed transducer 1204. Logic unit 1202 is user-programmable and, depending on the needs of the operator, logic unit 1202 records the variables and, then, if certain criteria are met, logic unit 1202 sends its own signal to adjuster 206. Thereafter, the condition, state or position of adjuster 206 of adjuster 206 is relayed back to logic unit 1202.

In one embodiment, logic unit 1202 shown in FIG. 12 assumes a single adjuster 206 corresponding to a single stiffness adjustment feature 118 of a single damper valve (e.g., damper valve 101) but logic unit 1202 is usable with any number of adjusters or groups of adjusters corresponding to any number of dampers or groups of dampers. For instance, the dampers on one side of the vehicle can be acted upon while the vehicles other dampers remain unaffected.

While the examples illustrated relate to manual operation and automated operation based upon specific parameters, the remotely-operated adjuster 206 can be used in a variety of ways with many different driving and road variables. In one example, adjuster 206 is controlled based upon vehicle speed in conjunction with the angular location of the vehicle's steering wheel. In this manner, by sensing the steering wheel turn severity (angle of rotation), additional dampening (by increasing the effective stiffness of a corresponding stiffness adjustment feature) can be applied to one damper or one set of dampers on one side of the vehicle (suitable for example to mitigate cornering roll) in the event of a sharp turn at a relatively high speed. In another example, a transducer, such as an accelerometer, measures other aspects of the vehicle's suspension system, like axle force and/or moments applied to various parts of the vehicle, like steering tie rods, and directs change to position of adjuster 206 (and corresponding change to the effective stiffness of a corresponding stiffness adjustment feature) in response thereto. In another example, adjuster 206 is controlled at least in part by a pressure transducer measuring pressure in a vehicle tire and adding dampening characteristics to some or all of the wheels (by increasing the effective stiffness of a corresponding stiffness adjustment feature) in the event of, for example, an increased or decreased pressure reading. In one embodiment, adjuster 206 is controlled in response to braking pressure (as measured, for example, by a brake pedal sensor or brake fluid pressure sensor or accelerometer). In still another example, a parameter might include a gyroscopic mechanism that monitors vehicle trajectory and identifies a "spin-out" or other loss of control condition and adds and/or reduces dampening to some or all of the vehicle's dampers (by increasing the effective stiffness of a corresponding stiffness adjustment feature) in the event of a loss of control to help the operator of the vehicle to regain control.

While the foregoing is directed to embodiments of the invention, other and further embodiments of the invention may be devised without departing from the basic scope thereof, and the scope thereof is determined by the claims that follow.

What we claim is:

1. A damper valve with an adjustable effective stiffness of a shim, said damper valve comprising:
    a fluid path formed through a piston, said shim disposed proximate said fluid path;
    a stiffness adjustment feature coupled to said shim; said shim disposed between said piston and said stiffness adjustment feature, said stiffness adjustment feature configured to adjust said effective stiffness of said shim without affecting a preload applied to said shim, wherein said stiffness adjustment feature comprises:
    a rotatable stiffness adjustment plate;
    a spring component coupled to said stiffness adjustment plate; and
    an adjuster coupled to said stiffness adjustment plate, said adjuster comprising:
        a first position which disposes said stiffness adjustment plate and said spring component in a first orientation with respect to each other, said first orientation of said stiffness adjustment plate and said spring component generating said effective stiffness of said shim; and
        a second position which disposes said stiffness adjustment plate and said spring component in a second orientation with respect to each other, said second orientation of said stiffness adjustment plate and said spring component generating a second effective stiffness of said shim wherein said effective stiffness of said shim differs from said second effective stiffness of said shim.

2. The damper valve of claim 1 wherein said stiffness adjustment feature is configured such that movement of said stiffness adjuster feature varies said effective stiffness of said shim without altering an existing force which acts upon said shim.

3. The damper valve of claim 1 wherein said stiffness adjustment feature is configured such that movement of said stiffness adjuster feature varies said effective stiffness of said shim without moving said shim toward or away from said piston.

4. The damper valve of claim 1 wherein said stiffness adjustment plate comprises:
    a first surface disposed facing said shim; and
    a second surface disposed facing said spring component.

5. The damper valve of claim 4 wherein said first surface of said stiffness adjustment plate further comprises:
    a shim engagement portion extending from said first surface of said stiffness adjustment plate, said shim engagement portion configured to engage with said shim.

6. The damper valve of claim 4 wherein said second surface of said stiffness adjustment plate further comprises:
    a spring component engagement portion extending from said second surface of said stiffness adjustment plate, said spring component engagement portion configured to engage with said spring component.

7. The damper valve of claim 6 wherein said spring component engagement portion is configured such that rotational movement of said stiffness adjustment plate with respect to said spring component varies a location at which said spring component engages with said spring component engagement portion of said stiffness adjustment plate.

8. The damper valve of claim 6 wherein said spring component engagement portion further comprises:
    a first location, wherein upon engagement of said stiffness adjustment plate with said first location of said spring component engagement portion, said stiffness adjustment feature generates said effective stiffness of said shim; and
    a second location, wherein upon engagement of said stiffness adjustment plate with said second location of said spring component engagement portion, said stiffness adjustment feature generates a second effective stiffness of said shim, wherein said effective stiffness of said shim and said second effective stiffness of said shim are different.

9. The damper valve of claim 6 wherein said spring component engagement portion further comprises:
   a first location, wherein upon engagement of said stiffness adjustment plate with said first location of said spring component engagement portion, said spring component is configured apply a first amount of force against movement of said stiffness adjustment plate towards said spring component; and
   a second location, wherein upon engagement of said stiffness adjustment plate with said second location of said spring component engagement portion, said spring component is configured apply a second amount of force against movement of said stiffness adjustment plate towards said spring component, wherein said first amount of force and said second amount of force are different.

10. The damper valve of claim 1 wherein said damper valve is disposed in a rebound circuit of a damper.

11. The damper valve of claim 1 wherein said damper valve is disposed in a high speed rebound circuit of a damper.

12. The damper valve of claim 1 wherein said damper valve is manually adjustable.

13. The damper valve of claim 1 wherein said damper valve is automatically adjustable.

14. A suspension damper having an adjustable effective stiffness of a shim, said suspension damper comprising:
   a housing enclosing a damping chamber;
   a piston disposed within said damping chamber, said piston movable within said damping chamber, said piston dividing said damping chamber into a first region and a second region;
   a fluid path formed through said piston, said shim disposed proximate said fluid path; and
   a stiffness adjustment feature coupled to said shim; said shim disposed between said piston and said stiffness adjustment feature, said stiffness adjustment feature configured to adjust said effective stiffness of said shim without affecting a preload applied to said shim, wherein said stiffness adjustment feature comprises:
   a rotatable stiffness adjustment plate;
   a spring component coupled to said stiffness adjustment plate; and
   an adjuster coupled to said stiffness adjustment plate, said adjuster comprising:
      a first position which disposes said stiffness adjustment plate and said spring component in a first orientation with respect to each other, said first orientation of said stiffness adjustment plate and said spring component generating said effective stiffness of said shim; and
      a second position which disposes said stiffness adjustment plate and said spring component in a second orientation with respect to each other, said second orientation of said stiffness adjustment plate and said spring component generating a second effective stiffness of said shim wherein said effective stiffness of said shim differs from said second effective stiffness of said shim.

15. The suspension damper of claim 14 wherein said stiffness adjustment feature is configured such that movement of said stiffness adjuster feature varies said effective stiffness of said shim without altering an existing force which acts upon said shim.

16. The suspension damper of claim 15 wherein said stiffness adjustment feature is configured such that movement of said stiffness adjuster feature varies said effective stiffness of said shim without moving said shim toward or away from said piston.

17. The suspension damper of claim 14 wherein said stiffness adjustment plate comprises:
   a first surface disposed facing said shim; and
   a second surface disposed facing said spring component.

18. The suspension damper of claim 17 wherein said first surface of said stiffness adjustment plate further comprises:
   a shim engagement portion extending from said first surface of said stiffness adjustment plate, said shim engagement portion configured to engage with said shim.

19. The suspension damper of claim 17 wherein said second surface of said stiffness adjustment plate further comprises:
   a spring component engagement portion extending from said second surface of said stiffness adjustment plate, said spring component engagement portion configured to engage with said spring component.

20. The suspension damper of claim 19 wherein said spring component engagement portion is configured such that rotational movement of said stiffness adjustment plate with respect to said spring component varies a location at which said spring component engages with said spring component engagement portion of said stiffness adjustment plate.

21. The suspension damper of claim 19 wherein said spring component engagement portion further comprises:
   a first location, wherein upon engagement of said stiffness adjustment plate with said first location of said spring component engagement portion, said stiffness adjustment feature generates said effective stiffness of said shim; and
   a second location, wherein upon engagement of said stiffness adjustment plate with said second location of said spring component engagement portion, said stiffness adjustment feature generates a second effective stiffness of said shim, wherein said effective stiffness of said shim and said second effective stiffness of said shim are different.

22. The suspension damper of claim 19 wherein said spring component engagement portion further comprises:
   a first location, wherein upon engagement of said stiffness adjustment plate with said first location of said spring component engagement portion, said spring component is configured apply a first amount of force against movement of said stiffness adjustment plate towards said spring component; and
   a second location, wherein upon engagement of said stiffness adjustment plate with said second location of said spring component engagement portion, said spring component is configured apply a second amount of force against movement of said stiffness adjustment plate towards said spring component, wherein said first amount of force and said second amount of force are different.

23. The suspension damper of claim 14 wherein said suspension damper is manually adjustable.

24. The suspension damper of claim 14 wherein said suspension damper is automatically adjustable.

25. An adjustable damper valve having a corresponding damping characteristic curve wherein an adjustment to an effective stiffness of said damper valve does not increase an initial slope of said corresponding damping characteristic curve, said adjustable damper valve comprising:
- a fluid path formed through a piston;
- a shim disposed proximate said fluid path; and
- a stiffness adjustment feature coupled to said shim; said shim disposed between said piston and said stiffness adjustment feature, said stiffness adjustment feature configured to adjust said effective stiffness of said shim without affecting a preload applied to said shim such that said corresponding damping characteristic curve is adjusted without imposing said increase of said initial slope to said corresponding damping characteristic curve.

26. The adjustable damper valve of claim 25 wherein said stiffness adjustment feature is configured to adjust a high-speed portion of said corresponding damping characteristic curve without disproportionately influencing a low-speed portion of said corresponding damping characteristic curve.

27. The adjustable damper valve of claim 25 wherein said stiffness adjustment feature is configured to adjust a high-speed portion of said corresponding damping characteristic curve without imposing an initial non-linearity to said corresponding damping characteristic curve.

28. The adjustable damper valve of claim 25 wherein said stiffness adjustment feature is configured to adjust said corresponding damping characteristic curve to approximate an ideal damping characteristic curve.

* * * * *